US005430850A

United States Patent [19]
Papadopoulos et al.

[11] Patent Number: 5,430,850
[45] Date of Patent: Jul. 4, 1995

[54] DATA PROCESSING SYSTEM WITH SYNCHRONIZATION COPROCESSOR FOR MULTIPLE THREADS

[75] Inventors: Gregory M. Papadopoulos, Burlington; Rishiyur S. Nikhil, Arlington, both of Mass.; Robert J. Greiner, Chandler, Ariz.; Arvind, Arlington, Mass.

[73] Assignee: Massachusettes Institute of Technology, Cambridge, Mass.

[21] Appl. No.: 734,252

[22] Filed: Jul. 22, 1991

[51] Int. Cl.$^6$ .............................................. G06F 15/80
[52] U.S. Cl. .................... 395/375; 364/DIG. 1; 364/DIG. 2; 364/230; 364/231.8; 364/231.9; 364/262.4; 364/931; 364/931.01; 364/931.4; 364/931.44; 364/931.48
[58] Field of Search ..................... 395/375, 650, 800; 364/DIG. 1 MS File, DIG. 2 MS File

[56] References Cited

U.S. PATENT DOCUMENTS

| | | | |
|---|---|---|---|
| 4,481,573 | 11/1984 | Fukunaga et al. | 395/400 |
| 4,819,155 | 4/1989 | Wulf et al. | 395/375 |
| 4,858,105 | 8/1989 | Kuriyama et al. | 395/375 |
| 4,943,908 | 7/1990 | Emma et al. | 395/375 |
| 5,050,068 | 9/1991 | Dollas et al. | 395/375 |
| 5,050,070 | 9/1991 | Chastain et al. | 395/375 |
| 5,226,131 | 7/1993 | Grafe et al. | 395/375 |
| 5,241,635 | 8/1993 | Papadopoulos et al. | 395/375 |

OTHER PUBLICATIONS

Iannucci, Robert A., "Toward a Dataflow/Von Neumann Hybrid Architecture", *The Computer Society of the IEEE*, The 15th Annual International Symposium on Computer Architecture, May 30–Jun. 2, 1988, Honolulu, Hi., pp. 131–140, (1988) (Abstract).
*Efficient Dynamic Scheduling of Medium–Grained Tasks for General Purposing Parallel Processing*, Musciano et al. Aug. 15, 1988 pp. 166–175.
*Toward a Dataflow/Von Neumann Hybrid Architecture*, Iannucci Feb. 1988 pp. 131–140.
Draves, Richard P. et al., "Using Continuations to Implement Thread Management and Communication in Operating Systems," Operating Systems Review, vol. 25, No. 5, Oct. 13, 1991, pp. 122–136.
Musciano, Albert J. et al., "Efficient Dynamic Scheduling of Medium–Grained Tasts for General Purposing Parallel Processing," *Proceedings of the 1988 International Conference of Parallel Processing*, vol. II, 15 Aug. 1988, London, GB, pp. 166–175.
Hieb, Robert et al., "Continuations and Concurrency," *Sigplan Notices*, vol. 25, No. 3, 14 Mar. 1990, Seattle, U.S., pp. 128–136.

(List continued on next page.)

*Primary Examiner*—Robert B. Harrell
*Attorney, Agent, or Firm*—Hamilton, Brook, Smith & Reynolds

[57] ABSTRACT

A multiprocessor system comprises a plurality of processing nodes, each node processing multiple threads of computation. Each node includes a data processor which sequentially processes blocks of code, each block defining a thread of computation. The code includes instructions to send start messages with data values to start new threads of computation. Each node also includes a synchronization coprocessor for processing start messages from the same and other nodes of the system. The coprocessor processes the start messages to store values as operands for threads of computation, to determine when all operands required for a thread of computation have been received and to provide an indication to the data processor that a thread of computation may be initiated. The data processor subsequently nonsynchronously initiates the thread of computation. Preferably, the processors load and store from and to a common memory with the translation from a local virtual address to a local physical address. The data processor creates messages to remote nodes using a global virtual address which is translated before transmission to a node designation and a local virtual address at the remote node. The synchronization coprocessor is a pipeline processor in which a data cache stage is modified to increment and test a counter value during a join operation.

25 Claims, 8 Drawing Sheets

OTHER PUBLICATIONS

Holmes, V. P. et al., "A Designer's Perspective of the Hawk Multiprocessor Operating System Kernel," *Operating Systems Review (SIGOPS)*, vol. 23, 3 Jul. 1989, New York, U.S., pp. 158-172.

Hansen, Per Brinch, "Operating System Principles," Prentice-Hall, Inc., Englewood Cliffs, N.J., 1973, pp. 145-150.

Roos, Joachim, "A Real-Time Support Processor for Ada Tasking," *Computer Architecture News*, vol. 17, No. 2, Apr. 1989, New York, U.S., pp. 162-171.

Rishiyur S. Nikhil et al., "Can dataflow subsume von Neumann computing?," *In Proceedings of the 16th. Annual International Symposium on Computer Architecture*, Jerusalem, Israel, pp. 262-272, May 29-31, 1989.

Papadopoulos et al., "Monsoon: an Explicit Token-Store Architecture," *In Proc. 17th Int'l Symp. on Computer Architecture*, Seattle, Wash., May 1990.

Sakai et al., "An Architecture of a Dataflow Single Chip Processor," *In Proc. 16th Annual International Symposium on Computer Architecture*, Jerusalem, Israel, pp. 46-53, May 28-Jun. 1, 1989.

Dennis et al., "An Efficient Pipelined Dataflow Processor Architecture," *In Proc. Supercomputing Conference*, Orlando, Fla., pp. 368-373, Nov. 14-18, 1988.

Agarwal et al., "APRIL: A Processor Architecture for Multiprocessing," *In Proc. 17th Annual Intl. Symp. on Computer Architecture*, Seattle, Wash., U.S.A., pp. 104-114, May 28-31, 1990.

Halstead, Jr. et al., "MASA: A Multithreaded Processor Architecture for Parallel Symbolic Computing," *In Proceedings of the IEEE 15th. Annual International Symposium on Computer Architecture*, Honolulu, Hi., Jun. 1988.

Weber et al., "Exploring the Benefits of Multiple Hardware Contexts in a Multiprocessor Archituecture: Preliminary Results," *In Proceedings of the 16th Annual International Symposium on Computer Architecture*, Jerusalem, Israel, pp. 273-280, May 29-31, 1989.

Arvind et al., "Two Fundamental Issues in Multiprocessing," *In Proceedings of DFVLR—Conference 1987 on Parallel Processing in Science and Engrg*, Bonn-Bad Godesberg, W. Germany, Springer-Verlag LNCS 295, Jun. 25-29, 1987.

Kuehn et al., "The Horizon Supercomputing System: Architecture and Software," *In Prof. IEEE Supercomputing Conference*, Florida, pp. 28-34, 1988.

Thistle et al, "A Processor Architecture For Horizon," *In Prof. IEEE Supercomputing Conference*, Florida, pp. 35-41, 1988.

Dally et al., "Architecture of a Message-Driven Processor," *In Proc. 14th. Annual Intl. Symp. on Computer Architecture*, Pittsburgh, Pa., pp. 189-196, Jun. 1987.

Arvind et al., "I-Structures: Data Structures for Parallel Computing," *ACM Transactions on Programming Languages and Systems*, 11(4): 598-632, (1989).

Richard Buehrer et al., "Incorporating Data Flow Ideas into van Neumann Processors for Parallel Execution," *IEEE Transactions on Computers*, C-36(12): 1515-1522, (1987).

DATA PROCESSING SYSTEM WITH SYNCHRONIZATION COPROCESSOR FOR MULTIPLE THREADS

This invention was made with government support under contract Number N00014-89-J-1988 awarded by the Department of the Navy. The government has certain rights in the invention.

BACKGROUND OF THE INVENTION

Many are interested in the goal of general purpose computing that achieves very high speeds by exploiting parallelism in a scalable, cost-effective way. There seems to be widespread consensus that the architecture of such machines will be composed of a number of nodes interconnected with a high speed, regular network, where each node is built with an off-the-shelf microprocessor. Because such machines are built out of commodity parts, and because the topology is scalable, it is felt that such a machine with hundreds or thousands of nodes will be cheaper and faster than classical supercomputers, which are built with exotic technology and are thus very expensive.

To date, the prevailing opinion seems to be that microprocessors have their own evolutionary momentum (from CISC to RISC and, now, to a multiple instruction issue), and that a massively parallel machine will simply track this wave, using whatever microprocessors are currently available. However, a massively parallel machine is in fact a hostile environment for today's micros, arising largely because certain properties of the memory system in a massively parallel machine are fundamentally different from those assumed during the evolution of these micros. In particular, most micros today assume that all memory is equally distant, and that memory access time can be made effectively small by cacheing. Both these assumptions are questionable in a massively parallel machine.

On the other hand, dataflow processors have been designed from the start by keeping in mind the properties of the memory system in a parallel machine. However, past dataflow processor designs have neglected single-thread performance, and hence must be classified as exotic, not the kind of processor to be found in commodity workstations.

To be cost-effective, the micros used in massively parallel machines should be commodity parts, i.e., they should be the same micros as those used in workstations and personal computers. Market forces are such that a lot more design effort can be expended on a stock microprocessor than on a processor that is sold only in small quantities. In addition, there is a question of software cost. Parallel programs are often evolved from sequential programs, and will continue to use components that were developed for single-thread uniprocessors (such as transcendental function libraries, Unix, etc.). This does not mean that we are restricted to using good, conventional microprocessors in any parallel machine that we build. All it means is that any new processor that we design for multiprocessors must also stand on its own as a cheap and viable uniprocessor.

Parallel programs contain synchronization events. It is well known that processor utilization suffers if it busy-waits; to avoid this, some form of multiplexing amongst threads (tasks or processes) is necessary. This is true even in uniprocessors.

In order to build parallel machines that are scalable both physically and economically, we must face the fact that inter-node latency in the machine will grow with machine size, at least by a factor of log (N), where N is the number of nodes in the machine. Thus, access to a non-local datum in a parallel machine may take tens to hundreds of cycles, or more. If we are to maintain effective utilization of the machine, a processor must perform some other useful work instead of idling during such a remote access. This requires that the processor be multiplexed amongst many threads, and that remote accesses must be performed as split transactions, i.e., a request and its response should be treated as two separate communication events across the machine. If we follow this argument a step further, we see that a communication entering a node will arrive at some relatively unpredictable time, and that we need some means of identifying the thread that is waiting for this communication. This is, in fact, a synchronization event.

Thus, the following picture emerges. In a parallel machine, the way to deal with long inter-node latencies is exactly the way to deal with synchronization. A program must be compiled with sufficient parallel slackness ("excess parallelism") so that every processor has a pool of threads instead of a single thread, and some threads are always likely to be ready to run. Each processor must be able to multiplex itself efficiently amongst these threads. All communications should be split transactions, in which (a) an issuing processor does not block to await a response, and (b) a receiving processor can efficiently identify and enable the thread that awaits an incoming communication. For a more thorough explication of this argument, please refer to Arvind and R. A. Iannucci, "Two Fundamental Issues in Multiprocessing," *Proceedings of DFVLR—Conference 1987 on Parallel Processing in Science and Engineering*, Bonn-Bad Godesberg, W. Germany, Springer-Verlag LNCS 295, Jun. 25-29, 1987.

Modern von Neumann microprocessors are excellent single-thread processors, but they are not designed to exploit parallel slackness efficiently. First, the cost of multiplexing amongst threads is high because of the enormous processor state that is associated with the currently executing thread. This state manifests itself in the register set and instruction and data caches, all of which may have to be reloaded with the new thread's context. Second, for a parallel environment, there is no efficient mechanism for naming, communicating and invoking continuations for split transactions to access remote locations. Third, many first-generation parallel machines had very poor interfaces to the interconnection network. There was a large software cost in handling incoming messages. This was further aggravated by the fact that messages trying to cross a node had to go through the node. However, many of the successors of these machines have solved this problem somewhat by devoting separate resources to message handling.

The net result is a high communication and synchronization cost with von Neumann machines. Programs can be written to use these machines effectively provided they minimize the occurrence of communication and synchronization events, and there are many success stories that do so. However, there is a high software cost associated with trying to structure programs to fit this model, and it is still a far cry from our goal of truly general purpose computing.

Dataflow architectures have evolved substantially over the years. We will focus our comments on Monsoon (G. M. Papadopoulos, "Implementation of a General-Purpose Dataflow Multiprocessor," PhD thesis, Laboratory for Computer Science, Massachusetts Institute of Technology, Cambridge, Mass. 02139, August 1988; G. M. Papadopoulos and D. E. Culler, "Monsoon: An Explicit Token Store Architecture," Proc. 17th Intl. Symp. on Computer Architecture, Seattle, Wash., May 1990 and U.S. patent application Ser. No. 07/396,480) as the most recent representative of that evolution.

Dataflow architectures are excellent at exploiting parallel slackness. Indeed, this has always been a major underlying rationale for dataflow architectures. Parallel slackness is achieved by partitioning a program into extremely fine grain threads; in the pure dataflow model, each instruction is a separate thread. A thread descriptor is implemented as a token, which includes three parts (FP, IP, V), where:

FP is a frame pointer, which points at a frame relative to which the instruction will be executed;
IP is an instruction pointer, which points t code; and
V is a data value.

The pool of threads in a processor is manifest at a token queue. On each cycle, a token is extracted from the token queue, and the instruction to which it refers is executed by the processor relative to the frame to which it points. Every instruction explicitly names its successor instruction(s). As a result of this execution, zero, one, or two successor tokens are produced, which are placed back in the token queue. Thus, a dataflow processor like Monsoon can multiplex between threads on every cycle.

Split transactions are performed thus: when a processor wishes to read a remote location A, it executes a fetch instruction. This causes a "read" token to be constructed and injected into the network. Suppose the fetch instruction names label L as its successor instruction. The corresponding read request token contains the following information:

(READ, A, FP, L)

Once the read request token is sent out, the processor continues to execute other tokens in its token queue. When the read request token reaches the remote memory, the following token is sent back:

(FP, L, V)

This token is placed in the token queue to be executed just like any other token.

In addition, Monsoon also has an efficient mechanism to synchronize two threads. Two threads that must join will arrive at a common instruction that names a frame location which contains "presence bits", which can be regarded as a synchronization counter. On arrival, each thread causes the counter to decrement. When the first thread arrives, the counter does not reach its terminal value; the instruction is aborted and the processor moves on to execute another token from the token queue. When the second thread arrives, the counter reaches its terminal value and the instruction is executed.

Thus, dataflow architectures (and Monsoon in particular) provide good support for exploiting parallel slackness fine grain threads, efficient multiplexing, cheap synchronization, and support for split transactions to mask inter-node latency.

However, present dataflow architectures do not have good single-thread performance. The fundamental problem is that present dataflow architectures do not provide adequate control over the scheduling of threads. In the pure dataflow model, successive tokens executed by the processor may refer to arbitrarily different frames and instructions. The consequence is that an instruction can transmit values to its successors only through slow memory—it cannot exploit any special high speed storage such as registers and caches. In conventional uniprocessors, caches allow fast transmission of values because the successor instruction is executed immediately, while a previously stored value is still in the cache. This locality through successor-scheduling is absent in pure dataflow models. Pure dataflow models allow exactly one value to be transmitted without going to memory—the value on the token.

Monsoon improves on this situation. In Monsoon, an instruction can annotate one of its successors so that it is executed directly, i.e., instead of placing the token back into the token queue, it is recirculated directly into the processor pipeline. Thus, in a chain of such direct successors, instructions can communicate values down the thread via high speed registers—no other thread can intervene to disturb the registers. However, Monsoon still has some engineering limitations that limit single-thread performance, namely, (a) very few registers (only three) and (b) the processor pipeline is eight cycles long, so that each instruction in a chain takes eight cycles.

In Monsoon, control over scheduling stops at this point. A chain of direct successors is broken when it reaches an instruction that is a split transaction instruction (like a load), or when it reaches an instruction that executes a join that fails. At this point, there is no further control on the next thread to be executed. If we had such control, we might, for example, choose another thread from the same frame, to maintain locality with respect to the current frame.

DISCLOSURE OF THE INVENTION

The present invention provides the fast single-thread execution of conventional micros, coupled with the facilities to exploit parallel slackness from dataflow architectures. In addition, we provide tight control over the scheduling of threads.

In accordance with one aspect of the present invention, a von Neumann data processor processes threads of computation, those threads including operations to generate messages for initiating new threads of computation. A synchronization coprocessor responds to the messages and indicates to the data processor when a new thread of computation maybe performed. The data processor subsequently initiates processing of the new thread of computation.

The messages may include a start message which comprises a pointer to an activation frame and a pointer to a synchronization coprocessor instruction in order to start a thread of computation. In a further application of the invention, the messages include object oriented messages which identify a method, an object and arguments. In that case, the synchronization coprocessor establishes a frame in which at least the arguments are stored and identifies that frame to the data processor. The synchronization processor may also locate an instruction pointer into the method and provide that to the data processor.

In a multiprocessor system comprising a plurality of processing nodes, each node processes multiple threads of computation. In a preferred addressing approach, each data processor operates on a local virtual address space, and each node has means for translating from the local virtual address space to a local physical address space. Further, each data processor generates a global virtual address to access an address in a remote node, and each node comprises means for translating the global virtual address to a node designation and a local virtual address of the remote node.

Each data processor sequentially processes threads of code. In the preferred system, the code includes local memory load and store instructions, start instructions which cause start messages to be sent with data values to start new threads of computation and remote memory load and store instructions which cause messages to be sent to remote memory locations to fetch or store data from or in remote memory locations. The synchronization coprocessor processes start messages to store values from the start messages as operands for threads of computation, to determine when all operands required for a thread of computation have been received and to provide an indication to the data processor that a thread of computation may be initiated.

A system using a conventional RISC data processor includes a message formatter. The message formatter is instructed by the data processor to create messages to remote nodes of the data processing system. The message formatter comprises registers on a common bus with the data processor in the address space of the data processor. The data processor instructs the message formatter to create messages by memory mapped stores to the message formatter registers. The data processor loads global virtual addresses along its data bus into registers in the message formatter. The number of bits in the global virtual address is greater than the number of bits available in the local virtual address space of the data processor. The message formatter translates the global virtual address to a node designation and a local virtual address on that node.

Preferably, the data processor and the synchronization coprocessor communicate with the common local memory in which operands are stored within activation frames by the synchronization coprocessor and fetched by the data processor. A cache memory is shared by the two processors. Further, the data processor is a single chip microprocessor which has a cache memory thereon.

The synchronization coprocessor may comprise a start processor for processing start messages and a remote memory processor for processing remote memory load and store instructions from remote nodes. A start message comprises a pointer to an activation frame and a pointer to a synchronization coprocessor instruction. The synchronization coprocessor also comprises a queue in which continuations are posted to serve as indications to the data processor that a thread of computation may be initiated. The continuation is comprised of a pointer to an activation frame and a pointer to a data processor instruction. Preferably, the continuations are presented by a frame registry according to priority to continue processing active frames in the data processor. A software list of continuations may be maintained where the capacity of the registry is exceeded. New threads of computation are initiated by the data processor by loading continuations from the queue.

The synchronization coprocessor is preferably a programmable processor with a processing pipeline. The processing pipeline includes counting hardware to test whether all operands per computational thread have been received. The hardware may be increment and test hardware for incrementing (positively or negatively) a value fetched from cache memory, testing the value and returning the incremented value to cache memory. Other counting techniques such as unary encoding in a bit field may also be used.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DESCRIPTION OF A PREFERRED EMBODIMENT

In most languages, when a procedure is invoked,
a frame (also known as an activation record) must be allocated for it;
arguments (if any) must be deposited in its frame; and execution of its code must be initiated.
When it terminates, it passes results to the frame of its continuation, and initiates computation there (usually, this is its caller). During execution, the frame is generally stored in registers.

In a parallel system, a procedure may invoke several other code blocks in parallel. Further, iterations of a loop may also be invoked in parallel and be distributed across the nodes of the machine. Where previously a loop ran in a single frame, we may now have to allocate separate frames for each iteration or group of iterations. In general, instead of a stack of frames, we now have a tree of frames. Because frames may now correspond both to the procedure invocations and to loop iterations, we prefer to use the term code block for the segment of code that is the unit of invocation.

We are going to use frames as the basis for locality. Frames may be distributed among the nodes of the parallel machine, but each frame must reside entirely within a single node. There is no such restriction on global data structures—a single object may span several nodes of the machine. For each frame in a node, the corresponding code block must also be present in that node. This means that if a code block is invoked in several nodes, copies of that code block must exist in all those nodes. A simple way to achieve this is to copy all code into all nodes, but code blocks could also be loaded dynamically on demand. The key point is that a particular invocation of a code block can always access its frame locations using local memory operations. Accessing locations in other frames or in global objects, however, may involve communication. This will be reflected in the instruction set of the processor in each node.

Figure 1:
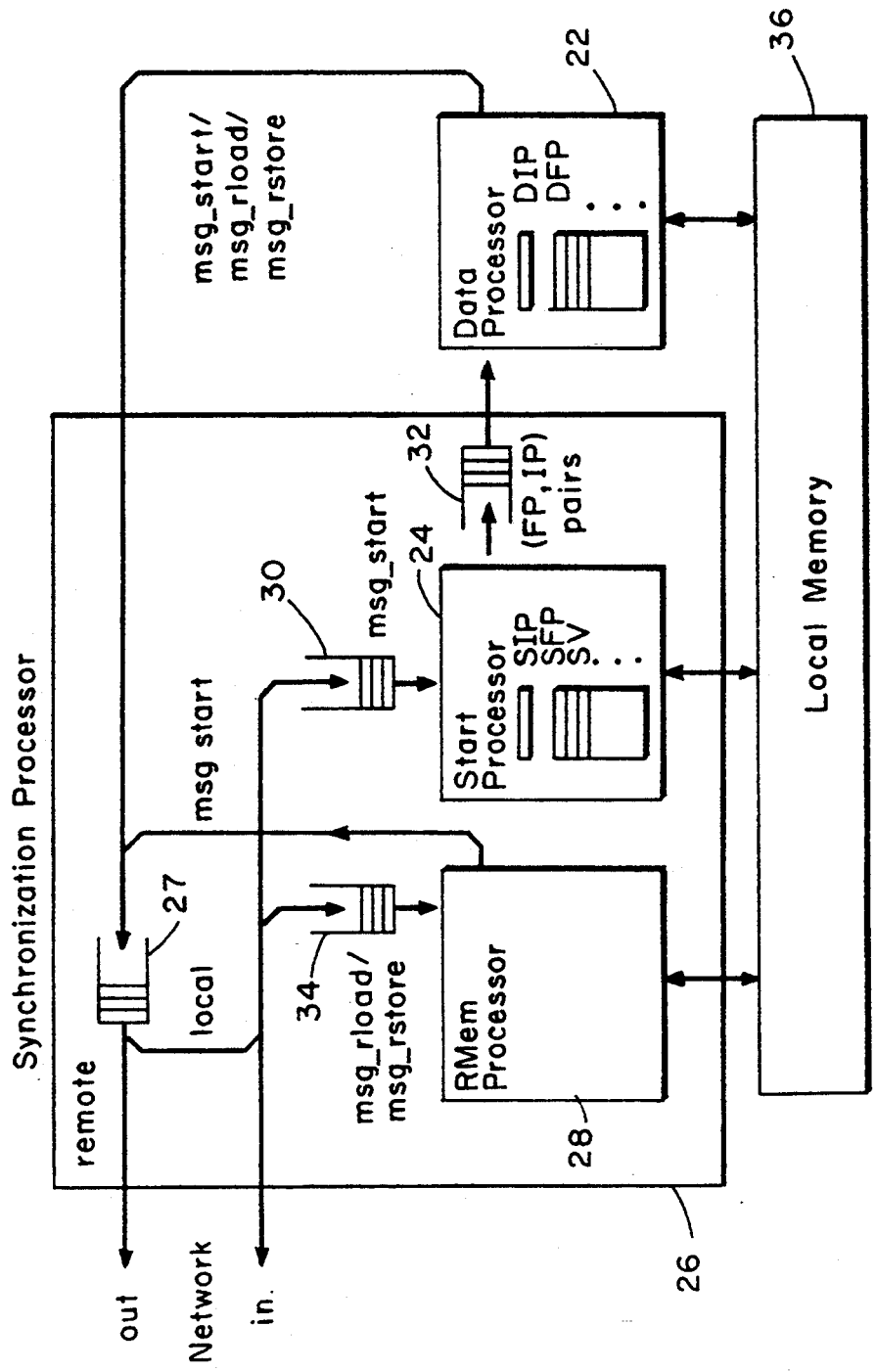
FIG. 1 is a schematic illustration of a single node of a multiprocessor embodying the present invention.

The *T (pronounced "start") model embodying the present invention for a node in a parallel machine is shown in FIG. 1. Although the memory of the machine is physically distributed amongst all the nodes, we assume a single global address space, i.e., the local memory in a node implements a piece of a single address space.

The Data Processor 22 is a superset of a conventional RISC processor, with a conventional repertoire of register-to-register instructions, and ability to manipulate local memory using conventional load and store instructions. Its program counter is called DIP ("Data processor Instruction Pointer"). One of its registers, called DFP, is assumed to contain a pointer to the "current frame" which is always in its local memory. Being a conventional RISC processor, the Data Processor 22 is optimized to run long, sequential threads efficiently. It obtains the starting points of these threads from a Start Processor 24 of a Synchronization Processor 26. On completion of a thread, if there is no new thread available from the Start Processor, the Data Processor simply waits until a thread becomes available. Clearly, for good utilization, this situation should be avoided.

In addition to its conventional RISC instructions, the Data Processor can execute a few additional "dataflow instructions" whose effect is to send messages into the network through a queue 27. These are non-blocking sends, i.e., the Data Processor continues executing after sending a message. The message can cause threads to be scheduled on the other nodes or on the same node, and a later response may deposit values in the sender's frame. As discussed below, by including a message formatter in the Synchronization Processor, the Data Processor can be a fully conventional RISC processor.

We will look at messages in more detail shortly, but for the moment it is enough to know that each message has the form:

msg_op arg1, arg2, ...

Arg1 is always a global address that identifies a unique destination node in the parallel machine. The message is automatically routed there. Of course, messages to the current node are short-circuited back directly. Broadly speaking, msg_ops fall into two categories: "start" messages and "remote memory" messages. Start messages ultimately initiate processing of a thread by the data processor. Remote memory messages serve to write or fetch data into or from memory; fetched data is ultimately returned to the requesting node with a start message. For convenience, the two types of messages are handled by separate processors within the synchronization processor, but a single processor may be used. When a message arrives at a node, it is passed either to the Start Processor 24 through a queue 30 or to an RMem Processor 28 through a queue 34 based on the category of it msg_op.

The Start Processor has a program counter called SIP ("Start processor Instruction Pointer"), two special registers SFP and SV and, perhaps, other general purpose registers. The Start Processor is triggered by the arrival of a start message from a queue. It simply waits if there is no start message available. When it picks up a start message, its SIP, SFP and SV registers are loaded with values from the message, after which it begins executing instructions from the address in SIP. It can read and write local memory 36 and it can post new thread identifying (FP, $L_D$) pairs to a queue 32 to be picked up by the Data Processor in initiating new threads of computation. FP is a frame pointer and $L_D$ is a pointer to the block of code for the thread.

Because both the Start Processor and the Data Processor may execute instructions, we will distinguish labels for the two processors by the subscripts S and D, respectively.

Figure 2:
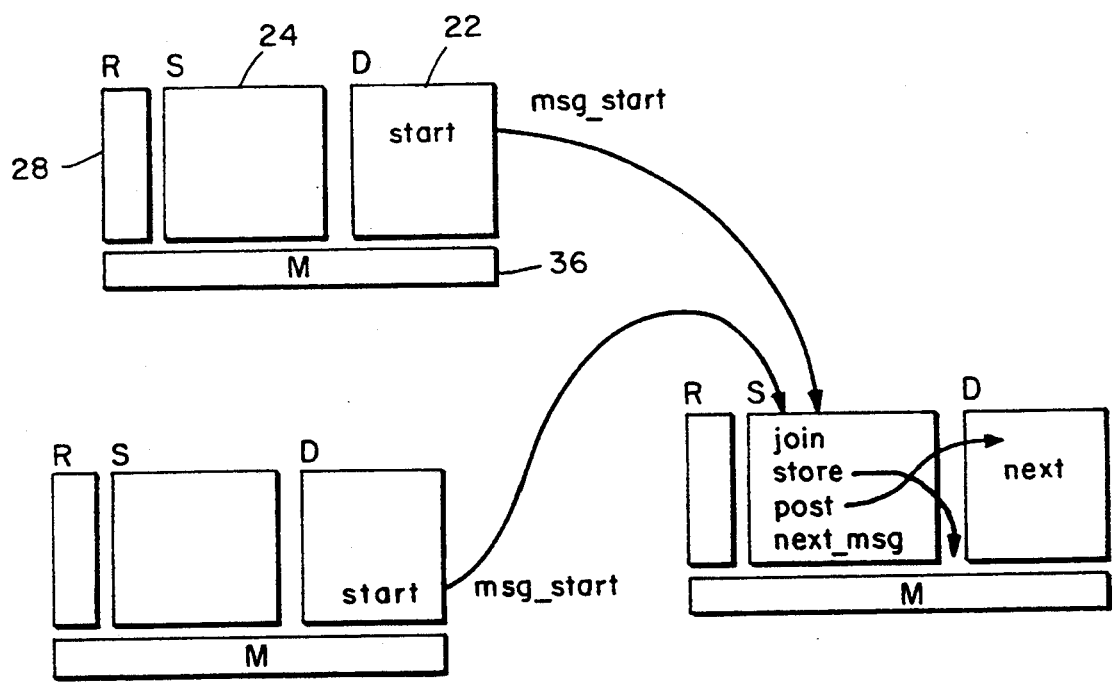
FIG. 2 illustrates the transmission of start messages between plural nodes of a data processing system.

The instruction set of the Data Processor is a proper superset of a conventional RISC instruction set, so we will assume the reader is familiar with conventional arithmetic-logic and comparison instructions, unconditional and conditional jumps, etc. We will focus here only on the novel, dataflow instructions that have to do with threads and synchronization. While reading the descriptions below, please refer to FIG. 2 for an overview of the thread-related instructions and messages.

A common situation where we wish to start a new thread is when one code block F calls another code block G. For example, we may wish to transport an argument from F's frame to G's frame and to initiate a thread in G that will compute with it. Similarly, we may wish to transport a result back from G's frame to F's frame and to initiate a thread in F to compute with it. In general, these frames may be on different nodes, so we need an explicit communication to perform these actions. For this, we use a start instruction, which has three register arguments:

| Data Processor Instruction: | start rF, rI, rV |
| --- | --- |
| Semantics: | Let FP = Register [rF] |
| | Let $L_S$ = Register [rI] |
| | Let V = Register [rV] |
| | Send message: msg_start FP, $L_S$, V |

Note that the start instruction is effectively a fork, since the Data Processor continues to execute at the next instruction after it has initiated the message send. Note also that this is only the first half of a one-way communication, i.e., the start instruction only emits a msg_start message. In other words, the start instruction is a non-blocking send. The instruction pointer $L_S$ on the start message is a label for a Start Processor, not a Data Processor.

Readers familiar with dataflow literature will recognize that the contents of a msg_start message correspond exactly to a classical dataflow "token"—FP is the "context", $L_S$ is the "statement" and, of course, V is the value.

The fork instruction is a special case of the start instruction in which the destination frame is the same as the current frame, and no data value is transmitted. Of course, in this case, no message need be sent into the network—the msg_start message is short-circuited back directly to the local Start Processor:

```
Data Processor Instruction: fork rI
Semantics:      Let L_S = Register [rI]
                Let FP → Register [DFP]
                Send message: msg_startv FP, L_S, foo
``` where foo is an arbitrary value.

At this point, it is worth making some observations that contrast the start instruction with other models of forking threads.

The start instruction does not involve any resource allocation. In many other fork models, a fork involves the dynamic allocation of a new stack. In our model, dynamic resource allocation is separated out into a completely orthogonal issue, and the start instruction is very cheap—it just sends a simple message.

In many fork models, each fork is a sequential thread associated with a stack with possibly multiple frames. In our model, every frame can have multiple threads active in it. In fact, there is no limit to the number of threads active within a frame.

The Data Processor can terminate a thread and begin executing a new one by executing a next instruction:

```
Date Processor Instruction: next
Semantics:      A new frame pointer FP and
                a new instruction pointer L_D
                are loaded from the Start
                Processor into the Data
                Processor into DFP and DIP
                registers.
```

The Data Processor thus continues fetching and executing instructions from $L_D$.

As discussed below, the data flow specific start, fork and next instructions can be implemented by conventional RISC instructions load and store (fetch and write) cooperating with Synchronization Processor hardware.

The Start Processor may be thought of as a transaction processor: it dequeues a start message, does some processing, and is then ready to dequeue the next start message. Incoming messages have the form:

```
msg_start FP, L_S, V
```

In response to such a message, FP, $L_S$, and V are loaded into the Start Processor's SFP, SIP and SV registers, respectively, after which it begins executing instructions at $L_S$. The Start Processor may, of course, have a general instruction set, but we focus here on the instructions that it needs to interact harmoniously with the Data Processor.

The following instruction allows the Start Processor to store the value SV on the incoming start message into the destination frame at an offset X identified in the start processor code:

```
Start Processor Instruction: store SFP[X], SV
Semantics:      Let A = Register [SFP] + X
                Memory[A] := Register[SV]
```

The following instruction allows the Start Processor to cause the Data Processor to begin executing at $L_D$ with respect to frame FP where $L_D$ and FP are found in start processor registers:

```
Start Processor Instruction: post rF, rI
Semantics:      Let FP = Register[rF]
                Let L_D = Register[rI]
                Post (FP,L_D) to be picked up
                by the Data Processor
```

The following instruction allows the Start Processor to start processing the next message:

```
Start Processor Instruction: next_msg
Semantics:      Reload SFP, SIP and SV from
                the next incoming msg_start
                message
```

Here is a typical code sequence that executes as a result of a start message that loads label $L_S$ into SIP:

```
L_S:
    store SFP[X], SV    -- store incoming value into
                           frame offset X
    post SFP, L_D       -- enable thread L_D with this
                           frame in Data Processor
    next_msg            -- done, handle next message
```

Synchronization is performed in the Start Processor using synchronization counters in the frames. For example, suppose node N1 sends two arguments to a frame in node N2, using the following two messages:

```
msg_start FPx, L_S, V1 msg_start FPx, M_S, V2
```

On arrival of each message, the corresponding values are stored in the frame at offsets X1 and X2, respectively. Then, a counter at an offset C (defined by start processor code) in the frame is incremented and compared with the constant 2 (we assume the counter was previously initialized to 0). The two messages may be processed in any order; the first message will find the counter equal to 1, and will go to process the next message. The second message will find the counter equal to 2 and will post (SFP, $L_D$) to the Data Processor which will find the values $V_1$ and $V_2$ in memory M for the frame FPx at the offsets $X_1$, and $X_2$ identified by start processor and data processor code. Here is the code:

```
L_S
    store SFP[X1],SV    -- store incoming value into
                           frame offset X1
    load R0, SFP[C]     -- load counter from frame offset
                           C
    incr R0             -- increment i
    store R0,SFP[c]     -- store it back
    cmp R0,2,RB         -- compare counter value to 2
    jeq RB,N_s          -- if equal, go to N_S
    next_msg            -- else die; handle next message
M_S
    store SFP[X1],SV    -- store incoming value into
                           frame offset X2
    load R0, SFP[C]     -- ...
    incr R0             -- ...
    store R0,SFP[c]     -- same as above
    cmp R0,2,RB         -- ...
    jeq RB,N_s          -- ...
    next_msg            -- ...
N_S
    post SFP,L_D        -- When both messages handled,
                           enable L_D in Data Processor
```

```
        -continued
next_msg       -- with this frame
```

Since we want to allow this kind of synchronization to happen very frequently, we implement the load-increment-store-compare sequence in a single join instruction. Also, the jump to $N_S$, post and next message instructions are implemented in a single conditional post, next message instruction cpostn.

Readers familiar with dataflow literature will recognize that the input queue of start messages for the Start Processor to which SFP and $L_D$ are posted corresponds to the "token queue" of dataflow architectures.

Global data accesses

Figure 3:
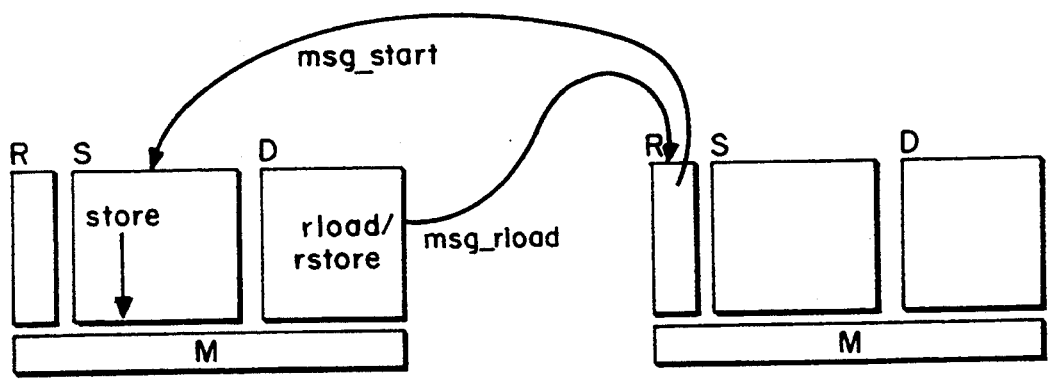
FIG. 3 illustrates transmission of a remote load message to a remote node and return of a start message.

A Data Processor in one node can access data in a remote node using remote load and store instructions which move the data to and from the current frame. Such instructions are implemented using split transactions. Once data has been brought into the current frame, it can be manipulated by the Data Processor using conventional instructions. While reading the descriptions below, please refer to FIG. 3 for an overview of instructions and messages related to global data accesses.

A remote load instruction fetches data from a remote node by sending a message:

```
Date Processor Instruction: rload rA, rI
Semantics:      Let A = Register[rA]
                Let L_S = Register[rI]
                Let FP = Register[DFP]
                Send message: msg_rload A,FP,L_S
```

The destination node is implicit in the global address A, which is used to route the message. When the message arrives at the remote node, it is handled by the RMem Processor of that node:

```
RMem Message:   msg rload A, FP, L_S
Semantics:      Let V = Memory[A]
                Send message: msg_start FP, L_S, V
```

We have already seen that the msg_start message is routed to the node specified by the address FP, and thus it returns to the node that issued the rload. There, the code at $L_S$ will store the value V into the frame FP, and typically a thread (FP, $L_D$) in the Data Processor will be enabled to compute with it.

Note that the rload instruction is also a fork—it simply initiates the load and continues executing at the next instruction. Thus, it is possible to initiate many remote loads before receiving any reply. Further, the msg_start messages may return in any order—they carry enough information on them to know how to process them as they arrive.

Remote stores are similar. The remote store instruction initiates a store message from values stored in registers:

```
Data Processor Instruction: rstore rA,rV,rI
Semantics:      Let A = Register[rA]
                Let V = Register[rV]
                Let L_S = Register[rI]
                Let FP = Register[DFP]
                Send message: rstore A,V,FP,L_S
```

The message is routed to the node identified by the global address A. There, it is handled by the RMem Processor:

```
RMem Message:   rstore A,V,FP,L_S
Semantics:      Memory[A]  := V
                Send message: msg_start FP,L_S,foo
```

Again, note that the rstore instruction is also a fork—it simply initiates the rstore and continues executing at the next instruction. Later, an acknowledgement comes back to (FP, $L_S$) (foo is an arbitrary value). The acknowledgement may be used to ensure serial consistency—the code at (FP, $L_S$) executes under a guarantee that the store has completed.

Rload's and rstore's are just the basic two remote memory operations. It is desirable to extend the repertoire beyond this in order to implement data level synchronization. With each global location that is used with data level synchronization, we associate some extra bits called "presence bits". Two of the states encoded in these bits are called "full" and "empty".

The rIload and rIstore instructions in the Data Processor have the same instruction formats as rload and rstore, respectively, and they generate similar remote memory messages with msg_rIload and msg_rIstore opcodes. A msg_rIload arriving at a full location behaves just like a msg_rload. Arriving at an empty location, it is deferred (i.e., queued) at that location. The response is sent later, when a corresponding msg_Istore arrives, which also deposits a value in the location and marks it full. These operations allow implementation of "I-structure" operations which are useful to implement producer-consumer parallelism (see Arvind and K. K. Pingali, "I-Structures: Data Structures for Parallel Computing," *ACM Transactions on Programming Languages and Systems*, 11(4):598–632, October 1989).

The rIload and rIstore instructions have the same instruction formats and behavior as the rload and rstore instructions, except that the messages that they generate have msg_rIload and msg_rIstore message opcodes:

```
Data Processor Instruction: rIload rA, rI
Semantics:      Let A = Register[rA]
                Let L_S = Register[rI]
                Let FP = REgister[DFP]
                Send message: msg_rIload A,FP,L_S
Date Processor Instruction: rIstore rA,rV,rI
Semantics:      Let A = Register[rA]
                Let V = Register[rV]
                Let L_S = Register[rI]
                Let FP = Register[DFP]
                Send message: msg_rIstore A,V,FP,L_S
```

The interesting difference between these instructions and rload/rstore is in the treatment of the messages at the remote node:

```
RMem Message:   msg_rIload A,FP,L_S
Semantics:      if full?(Memory[a])
                   Let V = Memory[A]
                   Send message: msg start, FP,L_S,V
                else
                   enqueue (FP,L_S) at Memory[A]
```

Note that if the location is full, an msg_rIload message behaves just like an msg_rload message. Otherwise, the message information is queued there to be handled later, in response to an msg_rIstore message:

| RMem Message: | msg_rIstore A,V,FP,L$_S$ |
|---|---|
| Semantics: | if empty?(Memory[A]) |
| |   Let queue = Memory[A] |
| |   Memory[A] := V |
| |   For each (FP',M$_S$) in queue |
| |     Send message: msg_start FP', M$_S$,V |
| |   Send message: msg_start, FP,L$_S$,foo |
| | else |
| |   error "Multiple writes not allowed" |

If the location is empty and no readers are queued there, it behaves just like an rstore, just storing the value there. If there are any queued readers, the value is also sent to them. Finally, if the location is full, it is a run time error. As in rstore, an acknowledgement message is also sent.

Remote loads and stores with data-level synchronization may be used to implement "I-structure" operations, which permit overlapped operation of the producer and consumer of a data structure.

The rtake and rput instructions in the Data Processor have the same instruction formats as rload and rstore, respectively, and they generate similar remote memory messages with msg_rtake and msg_rput opcodes. A msg_rtake arriving at a full location returns the value just like a msg_rload, but it also marks the location empty. Arriving at an empty location, it is deferred just like a msg_iload. A msg_rput arriving at a location with no deferred msg_rtake's behaves just like a msg_rIstore, marking the location full. If there are deferred readers, one reader is dequeued and the value is sent to it. These operations allow implementation of atomic updates on remote locations such as shared counters, shared queues, etc.

The instructions have the same format as rload and rstore:

| Data Processor Instruction: rtake rA,rI | |
|---|---|
| Semantics: | Let A = Register[rA] |
| | Let L$_S$ = Register[rI] |
| | Let FP = Register[DFP] |
| | Send message: msg_rtake A,FP,L$_S$ |
| Data Processor Instruction: rput rA,rV,rI | |
| Semantics: | Let A = Register[rA] |
| | Let V = Register[rV] |
| | Let L$_S$ = Register[rI] |
| | Let FP = Register[DFP] |
| | Send message: msg_rput A,V,FP,L$_S$ |

Again, the interesting difference between these instructions and rload/rstore is in the treatment of the messages at the remote node:

| RMem Message: | msg_rtake A,FP,L$_S$ |
|---|---|
| Semantics: | if full?(Memory[A]) |
| |   Let V = Memory[A] |
| |   Send message: msg_start FP,L$_S$,V |
| |   Set presence bit of Memory[A] to "empty" |
| | else |
| |   enqueue (FP,L$_S$) at Memory[A] |

Note that if the location is full, an msg_rtake message returns the value just line an msg_rload message, but it also resets the location to the empty state. Otherwise, the message information is queued there to be handled later, just like a msg_rIload message.

| RMem Message: | msg_rput A,V,FP,L$_S$ |
|---|---|
| Semantics: | if empty?(Memory[a]) |
| |   Let queue = Memory[A] |
| |   if queue is empty |
| |     Memory[A] := V |
| |     Set presence bit of Heap[A] to "full" |
| |   else |
| |     Let (FP',M$_S$) = head(queue) |
| |     Send message: msg_start FP',M$_S$, V |
| |     Memory[A] := tail(queue) |
| |   Send message: msg_start FP, L$_S$,foo |
| | else |
| |   error "Multiple writes not allowed" |

As in msg_rIstore, if the location in not empty, it is a run time error. Otherwise, if no readers are queued there, it behaves just like a msg_rstore or msg_rIstore—the value is simply stored there and the location is set to the full state. If there are queued readers, the first reader is taken off the queue and the value is sent there; the location remains empty.

Readers familiar with dataflow literature will recognize that if we omit the Start Processor and Data Processor in a node, leaving only the RMem Processor, the local memory and the interface to the network, the remaining node is precisely an "I-structure Memory" module.

Inter-thread and inter-frame scheduling control for better cacheing

So far, we have taken a simplistic view of the POST instruction in the Start Processor, which posts a new (FP, L$_D$) pair to be picked up by the Data Processor when it executes a NEXT instruction. FIG. 1 suggests that the interface is simply a FIFO queue 32. By being more sophisticated about this queue, we can improve locality in the Data Processor, thereby improving the behavior of any cache that resides between the Data Processor 22 and the local memory 36.

The Start Processor can sort the (FP, L$_D$) pairs according to FP. In other words, for each frame in the current node, it maintains the collection if IPs for that frame. There are various ways to implement this—as a separate table mapping FPs to collections of IPs, as a list of IPs hanging off each frame, or directly as an array within each frame. The exact representation is unimportant, provided the Start Processor can access it. In fact, the responsibility for managing these structures may be shared between the Start and the Data Processors. A specific implementation is discussed in a later section.

Now, the Start Processor can post (FP, L$_D$) threads to the Data Processor according to a priority scheduling policy. For example, it can give priority to threads that belong to the Data Processor's current frame. This is, in fact, exactly the scheduling policy advocated by Nikhil in his P-RISC compiler [R. S. Nikhil, "The Parallel Programming Language Id and its Compilation for Parallel Machines," *Proc. Workshop on Massive Parallelism*, Amalfi, Italy, October 1989, Academic Press, 1990 (to appear)] and by Culler in his Threaded Abstract Machine (D. E. Culler, A. Sah, K. E. Schauser, T. von Eicken, and J. Wawrzynek, "Fine-grain Parallelism with Minimal Hardware Support: A Compiler-Controlled Threaded Abstract Machine," August 1990). The current frame is thus treated as a "hot frame" where activity is currently focused. To implement this, the Start Processor needs to know what is the current contents of DFP in the Data Processor. This is quite easy to implement.

A generalization of this principle of hot frames is to maintain a set of hot frames rather than a single hot frame. We provide a small "registry" of hot frames (with, say, 16 entries), with threads from this set given priority. Registry of frames into this hot set can be performed either automatically of under explicit software control. We describe one proposal for such a frame registry in a later section.

An example: SAXPY

In this section, we demonstrate programming of *T by presenting hand-compiled code for SAXPY. We will address a number of issues, such as the use of split transactions to mask long latencies, the use of registers, etc. Finally, we show how *T can easily support various popular parallel programming models such as shared memory, SPMD/SIMD, object-oriented programming, etc.

SAXPY is the inner loop of the Linpack benchmark. Here is the SAXPY inner loop:

```
for i = 1 to N do
    Y[i] = a * X[i] = Y[i]
```

We assume that the current frame contains the following data, with symbolic names for the frame slots shown at left:

```
XP      pointer to X[1]
YP      pointer to Y[1]
A       loop constant A
YLim    pointer to Y[N]
...
```

*T uniprocessor code for the SAXPY loop is shown below. We use names beginning with "r" as symbolic names for general purpose registers.

```
        load DFP[XP], rXP       -- load ptr to X
        load DFP[YP], rYP       -- load ptr to Y
        load DFP[A], rA         -- load loop constant: a
        load DFP[YLim], rYLim   -- load loop constant: Y
                                   pointer limit
LOOP:
        cmp rYLim, rYP, RB      -- compare ptr to Y with
                                   limit
        jgt rB, OUT             -- jump out of loop if
                                   greater
        load rXP, rXI           -- load C
                                   X[i] into rXI (L1)
        load rYP, rYI           -- load Y[i] into rYI (L2)
        add 1, rXP, rXP         -- increment ptr to X
        mult rA, rXI, r1        -- a*X[i]
        add r1, rXI, r2         -- a*X[i] = Y[i]
        jump LOOP
OUT:
        ... loop sequel ...
```

This code runs entirely in the Data Processor; in a uniprocessor, the Start Processor and the RMem processor are ignored completely. (If N≧1 we could improve it by moving the conditional jump to the bottom of the loop so that there would only be one jump per iteration).

Let us consider what happens when memory latency increases dramatically, as in a multiprocessor. Each of the two loads L1 and L2 would be directly affected. Normally, the processor would stall at each of these instructions and performance would degrade. We might think of alleviating this problem using some kind of cacheing to decrease memory latency; however, the construction of coherent caches across the distributed memory of a large parallel machine is still an open problem.

Some modern processors use "delayed loads" to accommodate memory latency. Executing a delayed load can be viewed as forking off a memory request and continuing at the next instruction, followed by a join a few instructions downstream. Thus, memory latency is masked by some local parallelism.

The rload mechanism in *T can be viewed as a generalization of this idea. We will issue rload's to initiate the movement of X[i] and Y[i] into the local frame, and we will free up the processor to do other work. Each response arrives at the Start Processor, deposits the value into the frame, and tries to join with the other response at frame location c1. When the join succeeds, the Start Processor enables the thread in the Data Processor that computes with these data, executes an rstore and continues to the next iteration.

When the loop completes, it gives up the Data Processor. Meanwhile, the rstore acknowledgments all arrive at the Start Processor and join at frame location c2. The continuation of this join is the loop sequel. Here is the augmented frame layout:

```
XP      pointer to X[1]
YP      pointer to Y[1]
A       loop constant A
YLim    pointer to Y[N]
XI      copy of X[I]
YI      copy of Y[I]
c1      join counter for rloads
c2      join counter for rstores
...
```

Figure 4:
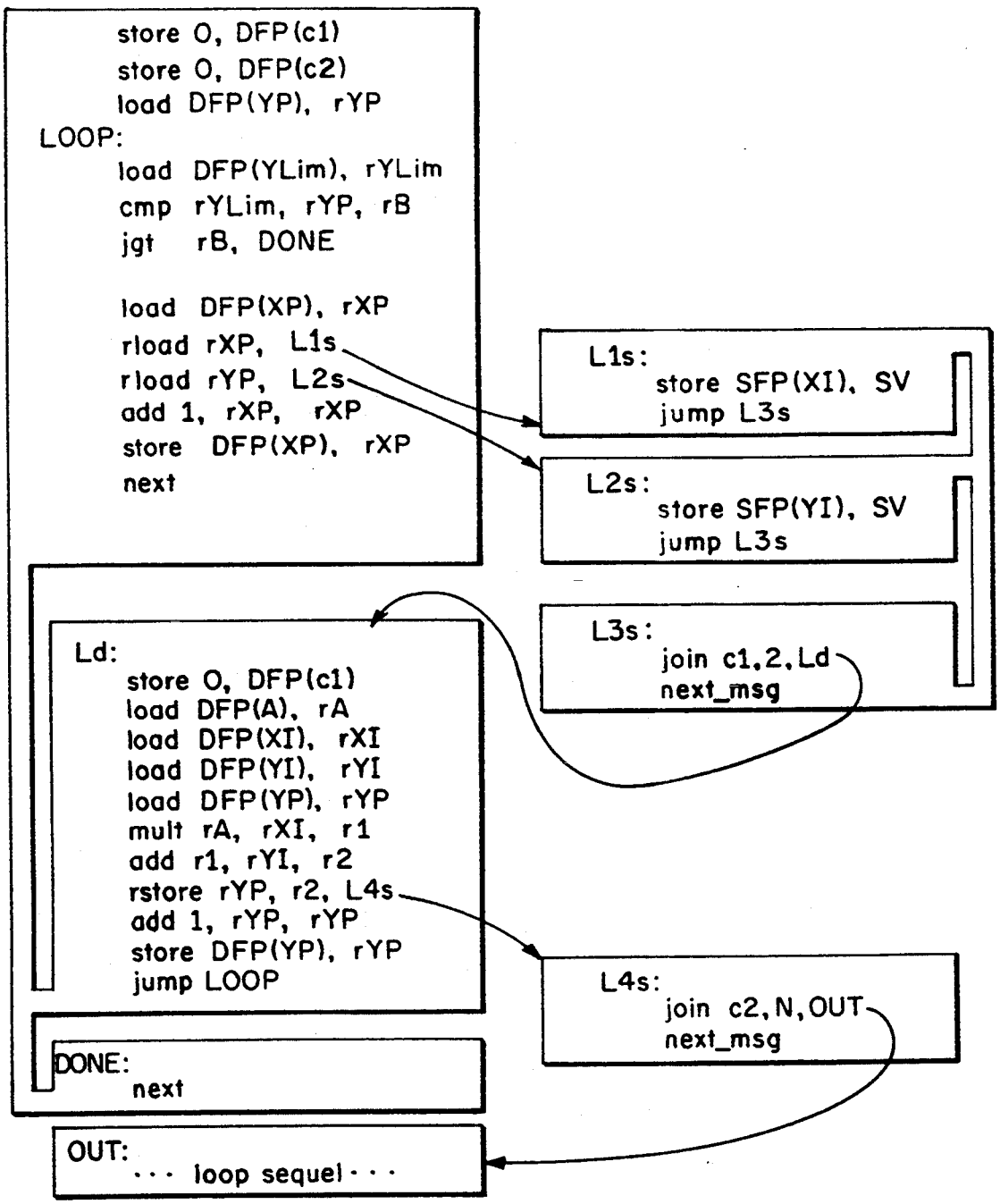
FIG. 4 presents the code for performing the SAXPY routine.

The code for this new version is shown in FIG. 4. The Data Processor code is shown at left, and the Start Processor code is shown at right. We have drawn boxes to assist the reader in recognizing the structure of the code, and shown arrows corresponding to interactions between the Data Processor and Start Processor. For brevity, we have not shown arrows for jumps and conditional jumps in either processor. Note that join counters c1 and c2 are initialized by the Data Processor before the loop, and that c1 is reset to zero by the Data Processor at Ld.

An unpleasant consequence of our new organization is that the Data Processor performs more loads and stores on the current frame than in the uniprocessor case. The reason is that, since we relinquish the Data Processor at the next instruction after the rload's, the registers may have changed by the time we get the Data Processor back at label Ld. Thus, we have to repeatedly reload the X and Y pointers and the loop constants Q and YLim, and repeatedly store the incremented X and Y pointers back. Further, where previously data moved directly from X[i] and Y[i] into registers rXI and rYI, they now move first to XI and YI in the frame, from where they have to be explicitly loaded into registers.

Figure 5:
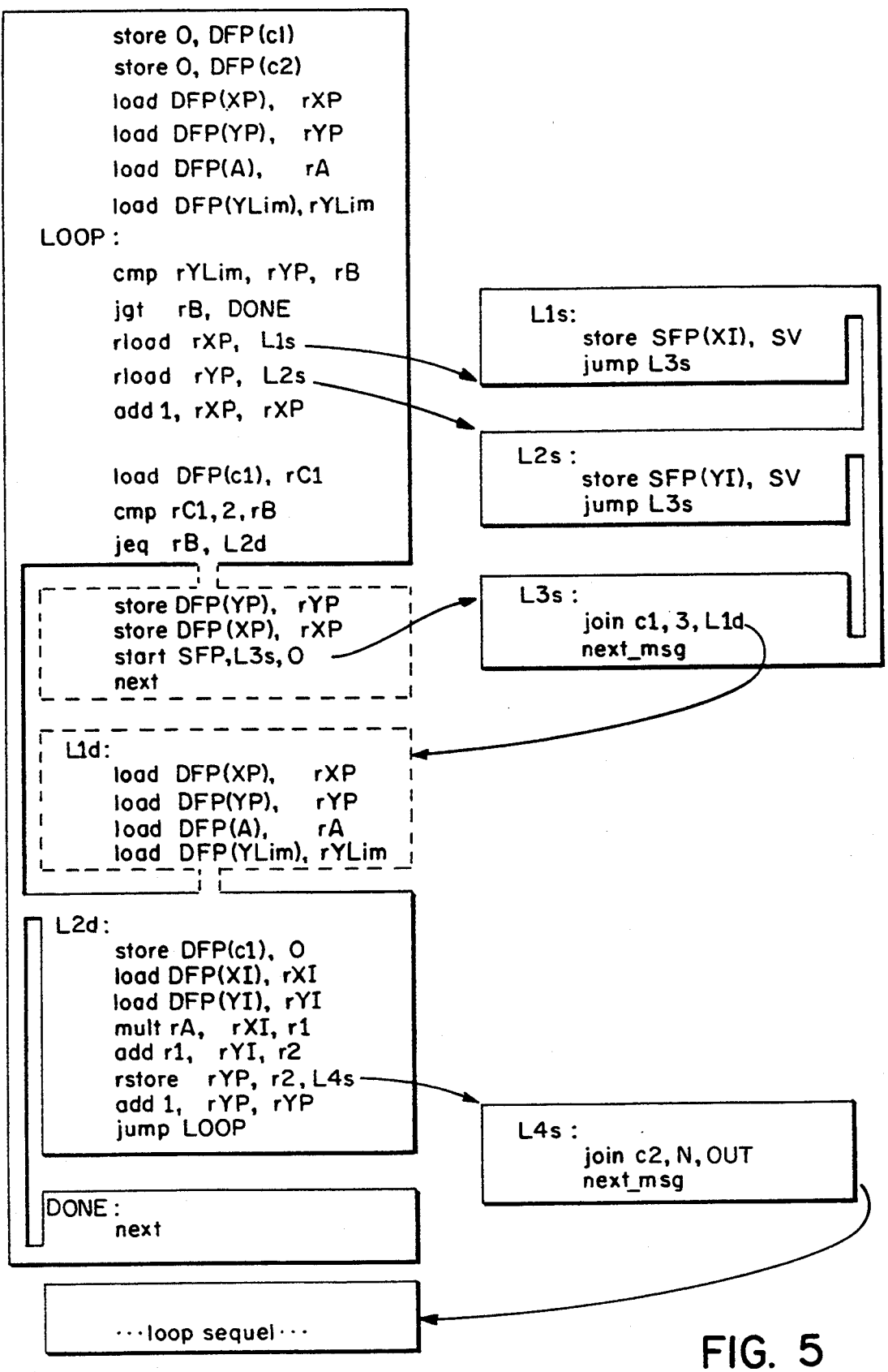
FIG. 5 illustrates an improved version of the SAXPY code.

The above code assumed the worst—that the rload latency is so long that the Data Processor must be relinquished to another thread. Instead, the Data Processor can peek at the join counter c1 and choose to continue if both the rload responses have arrived. If successful, registers do not have to be saved and restored from the frame. The modified code is shown in FIG. 5, with the register save and restore code shown in dashed boxes.

Here, as in our uniprocessor version, we preload the X pointer, Y pointer, A and YLim into registers before the loop. As in the second version, we also initialize the join counters c1 and c2 before the loop. Inside the loop, after issuing the two rload's, we peek at the join counter c1. If it is equal to 2, we jump directly to L2d. If not, we save the X and Y pointers in their frame locations, and start L3s in the Start Processor.

The two rload responses return to L1s and L2s, respectively, in the Start Processor. There they are saved in frame locations XI and YI, respectively, and execution continues at L3s. If the two response arrive quickly, they both die at the join, and the Data Processor will successfully see a value of 2 for c1. Otherwise, the join is executed thrice, and this enables L1d in the Data Processor.

In the Data Processor, the code at L1d is executed only if the Data processor had been relinquished. Thus, it reloads the X and Y pointers, and the loop constants A and XLim into registers, and falls through to L2d. The code at L2d is assured that its registers are ok. Thus, it does not have to reload the pointers of loop constants. Similarly, after incrementing the X pointer rXP, it does not have to save it to the frame.

Note that if control of the Data Processor has to be relinquished (because the rloads took too long), this version of the program will do worse than our original version. In practice, it may be necessary to fill the post-rload slots with more instructions to give them time to complete.

So far, we have concentrated on trying to improve a single iteration of the loop. However, there are still moments when the processor to memory pipeline lies idle, e.g., after the two loads have completed. If this is a problem, one can play a variety of other tricks to alleviate it.

The loop may be unrolled so that we perform the i'th and the i+1'th computation in a single iteration, and increment i by two on each iteration. In this case, we could issue four rload's in parallel instead of two, and two rstore's in parallel instead of one. Of course, the loop may be unrolled by a larger factor than 2.

The loop may be split into two parallel loops, with each loop computing on half of the arrays, using the following outline:

|  | start DFP, L1s | Ls1: post SFP, L2d next-msg |
|---|---|---|
| L1d: |  |  |
|  | ... loop 1 ... next |  |
| L2d: |  |  |
|  | ... loop 2 ... next |  |
| OUT: |  |  |
|  | ... loop sequel ... |  |

The start instruction has the ultimate effect of forking L1d and L2d in parallel. In this way, it is possible to compute in loop 1 while loop 2 is waiting for its rload's to complete, and vice versa, thus improving overall processor utilization.

Object Oriented Messages

The system is also well suited to object oriented programming. With an object oriented program, an upper level program specifies methods and objects on which the methods are to be performed. The actual code of the methods and the data structures of the objects are hidden from the higher level software. When a method is called relative to an object, the lower level software must locate the code for the method and the data for the object before the two are processed. In a multiprocessor system, it may be convenient to locate specific methods and objects on particular nodes.

In accordance with the present invention, a message between nodes may include an identification of the method, an identification of the object and arguments to be used in a method. The message is sent to the node at which the method and object are stored. The message also includes a return address to the initiating node.

On receipt of the message, the start processor would establish a frame and copy the arguments, an object pointer and the return address into the frame. The start processor may also look to the object to locate a table of method pointers, and then index into the table using the method number of the message to locate a data processor instruction pointer. The instruction pointer and a frame pointer are then provided in the continuation to the data processor.

Alternatively, the location of the instruction may be left to the data processor. In that case, the instruction pointer in the continuation would be to a handler which locates the instruction.

Compiling for *T

The *T machine model is suitable as a target for several programming models. We discuss this briefly here.

First, we repeat some salient points about locality. It is assumed that only accesses to the current frame are local. An instruction can only manipulate the current frame directly—all other accesses are performed using instructions that initiate split transactions. In a parallel machine with distributed memory:

Each frame must reside entirely within a single node's memory.

Frames may be distributed among the nodes of a machine.

A frame for code block A can only be allocated in a node that contains the code block A. If code block A is replicated on all nodes, frames for that code block can be allocated on any node.

Global objects may be allocated on any node, and a single object may straddle many nodes.

If the compiler can predict that other frames and objects are local (e.g., through static allocation or through directives to the runtime allocator), it can replace rload's and rstore's with ordinary loads and stores, and replace rstart's with ordinary procedure calls.

Registers are assumed to contain only thread-local data. If an instruction defines a particular register, a later instruction in the same invocation of the same thread may use it. However, nothing may be assumed about the contents of the registers at the start of a thread, since it is unpredictable as to which thread ran prior to the current one. Any data that must be communicated from one thread to another must be passed through the frame. We also say that registers are "volatile" or "ephemeral" across threads and that frame locations are "persistent" across threads.

Implementing Id and functional languages on *T is no more difficult than implementing it on existing architectures. The *T abstract machine model is, in fact, the latest step in a long line of development of compilers and architectures for functional languages. The interested reader is referred to Arvind and R. S. Nikhil, "Executing a Program on the MIT Tagged-Token Dataflow Architecture," *IEEE Transactions on Computers*, 39(3):300-318, March 1990 and K. R. Traub, "A compiler for the mit tagged-token dataflow architecture," Technical Report LCS TR-370, MIT Laboratory for Computer Science, 545 Technology Square, Cambridge, Mass. 02139, August 1986 for details.

This does not imply that all problems in compiling non-strict functional languages have been solved. For example, detecting long threads, storage reuse, load balancing, etc. remain challenging problems.

If we ignore the locality model that we have carefully built up in *T abstract machine, it is like a conventional, shared memory parallel machine. The tree of frames by which we describe our runtime structures properly subsumes the "cactus stack" model that is popular in implementations of parallel FORTRAN, C, and similar languages. The rtake and rput instructions may be used to implement semaphores for traditional synchronization mechanisms.

To date, the SPMD (Single Program Multiple Data) model and the less general SIMD model are the only successful model used to program large parallel machines. SPMD programs are usually run on so-called "multicomputers". Mapping an SPMD program to the *T abstract machine is quite easy.

The tree of frames has an especially trivial structure: the root frame has N children frames, where N is the number of nodes in the SPMD program. Each of these children then has a linear chain of descendants, i.e., each chain acts as a stack. The j'th stack is allocated on the j'th node. In other words, the root frame is simply used to for off N invocations of the same subprogram, with the j'th subprogram running entirely on the j'th node. Each subprogram is an ordinary sequential program.

The Global Data area is partitioned into exactly N equal-sized areas, and global data is statically mapped into these areas. The j'th global data area is considered to be local to the j'th node. This mapping is static, so that the compiler uses ordinary load and store instructions to access local data.

In the SPMD model, there is no direct access from the i'th node to data in the j'th node, where i≠j. Instead, the program in the i'th node communicates with program in the j'th node using send and receive primitives. This is modelled easily in the *T abstract machine as follows: A part of the global data area in each node is reserved for a message queue, representing messages entering that node. A source-level send command from any node to the node J is compiled by appending a reference to the message data structure into the j'th message queue. Implementing such shared message queues is easily done, using the rput and rget instructions. A source-level receive command in the j'th node is compiled by dequeing a reference to a message data structure its local message queue, and then using rload's to fetch the contents of the message.

An Implementation of *T

The *T model creates a clean separation between the execution of instructions within a thread (the data processor) and the processing of network messages and the scheduling of threads (the synchronization processor). This permits a realization wherein the data processor is a conventional RISC and the synchronization processor is a specialized function which behaves much like a memory-mapped coprocessor to the RISC.

Figure 6:
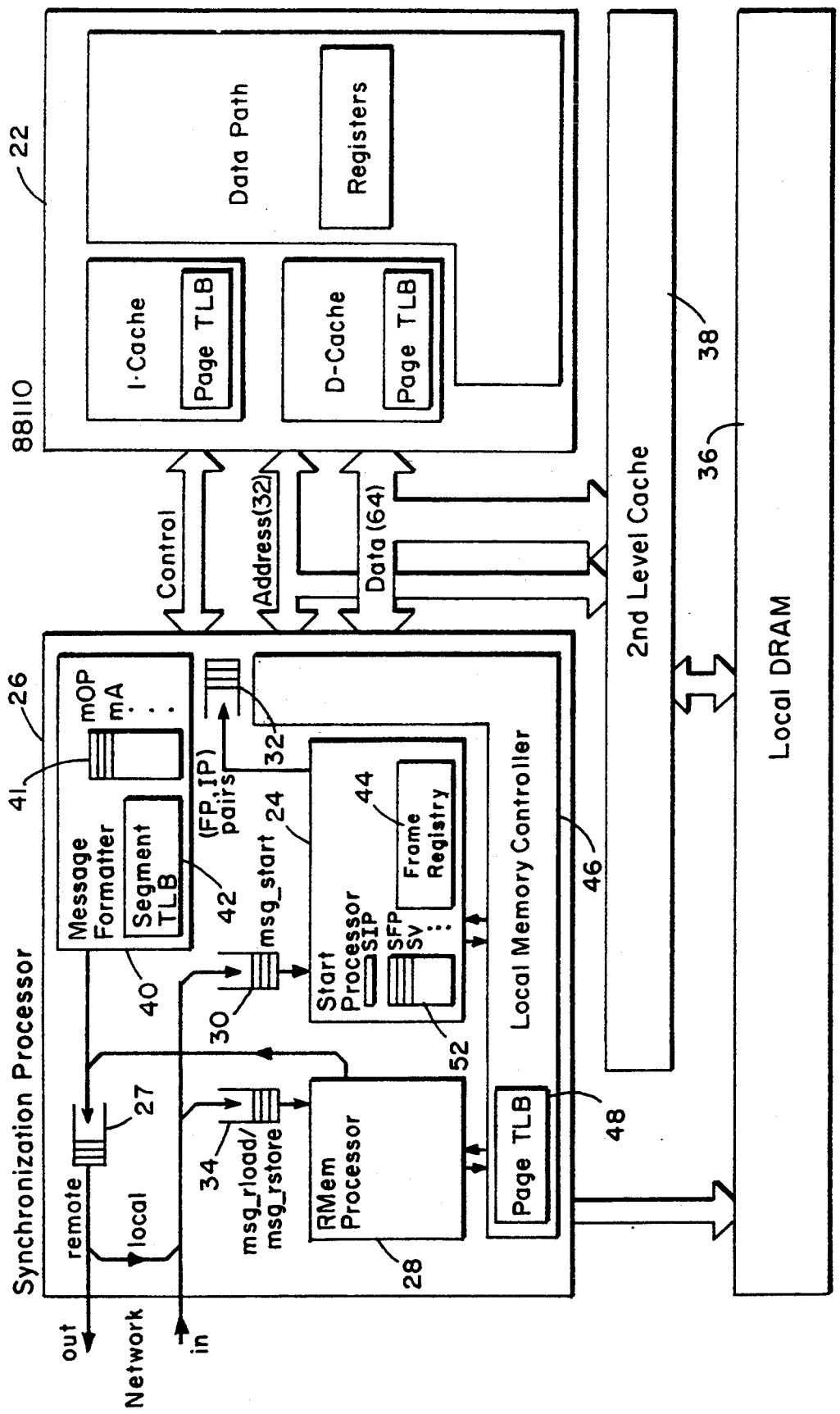
FIG. 6 is a more detailed illustration of the system of FIG. 1 employing a Motorola 88110 microprocessor.

We now present a concrete *T realization centered around the Motorola M88110, a highly integrated superscalar RISC microprocessor. The synchronization coprocessor documented here is easily adapted to any microprocessor which supports cache coherence. As illustrated in FIG. 6, a *T node comprises an unmodified M88110, a memory-mapped synchronization coprocessor/network interface 26, second level cache 38, data processor 22, and Local DRAM 36. The M88110 processor chip 22 includes an instruction cache 60 and a data cache 62. Each cache includes a virtual to physical local address translation buffer 64, 66. Several activation frames may be stored in the D-Cache 62 and the related blocks of code are stored in the I-cache 60. The activation frame being processed is temporarily retained in registers 68. The node is fully backward compatible such that the synchronization coprocessor is completely transparent to normal M88110 programs (e.g., UNIX). In terms of hardware protocol, the synchronization processor acts just like another M88110 sharing the local bus.

The synchronization processor comprises four distinct subfunctions:

Message Formatter 40. The message formatter maintains a set of memory-mapped registers 41 that, when written to by an executing M88110 thread, causes the creation and transmission of msg_rload, msg_rstore, and msg_start messages. For remote loads and stores, the message formatter also includes segment translation lookaside buffer hardware 42 for translating 64-bit global virtual addresses into a destination node number and 32-bit local virtual address on the destination node.

RMem Processor 28. The RMem processor services msg_rload and msg_rstore requests for global memory locations which map onto the current node. The RMem processor supports imperative and many styles of synchronizing data accesses (e.g., I-structures, M-Structures).

Start Processor 24. The start processor services all msg_start messages directed to the current node. The start processor also implements the hardware layer of the thread scheduler: queues of posted threads corresponding to a subset of "hot" frames as directed by a frame registry 44.

Local Memory Controller 46. The local memory controller supports access to locations in local virtual address space. The controller performs page translation to map the local virtual addresses into physical addresses, and also provides for block transfers between DRAM and the second level cache. The local memory controller services local memory read and write requests from the start and RMem processors. These requests are always in terms of local virtual addresses, so the memory controller must also support page translation to local physical addresses. A simple translation lookaside buffer 48 traps the M88110 upon a miss. The local memory controller also acts as a DRAM controller and is invoked whenever cache lines are moved to and from DRAM 36.

The synchronization and data processors intercommunicate in two ways. First, registers and queues implemented by the synchronization processor are memory mapped in the M88110 physical address space. For example, the M88110 will execute a next instruction by reading the head of the thread queue that is filled by the start processor. Second, the processors share the same virtual address space and may read and write shared variables. For example, the start processor will write the value portion of start messages in activation frame locations which are subsequently read by a posted thread. All of this communication takes place over the 64-bit local data bus. Synchronization processor registers and queues are directly read and written over this bus, while shared variables are, in general, found in the second level cache of DRAM.

In the following section we first describe a scheme for global addressing which is essential to understand the functioning of the Message-Formatter. It is followed by a description of executing dataflow instruction on a stock M88110. We then present a specific design of the Synchronization processor.

Global Addresses and Virtual Memory

The message formatter maintains a set of memory-mapped registers 41 that, when written to by an executing M88110 thread, causes the creation and transmission of msg_rload, msg_rstore, and msg_rstart messages. For remote loads and stores, the message formatter also includes segment translation hardware 42 for translating 64-bit global virtual addresses into a destination node number and 32-bit local virtual address on the destination node. The M88110 supports 32-bit byte-addresses, yielding a four gigabyte addresss space. Consider, however, a possible machine configuration comprising 4K nodes ($2^{12}$) with eight megabytes ($2^{23}$) of local memory per node. This is 128 gigabytes ($2^{37}$) in physical memory alone. Clearly, we require global addresses which are considerably larger than 32 bits. Our proposal for supporting a 64-bit global address space while still retaining efficient and compatible, local addressing is based upon segmentation. Consider the following:

A local Virtual Address (LVA) is a 48-bit quantity, $$LVA = n_{16}:v_{32}$$

where the v is a virtual address on node number n. All local memory references made by a processor (e.g., a normal M88110 load or store instruction) implicitly refer to its own node, so the node part is omitted and only v is supplied.

A Local Physical Address (LPA) is a 48-bit quantity, $$LPA = n_{16}:p_{32}$$

where the p is a physical address on node number n. As with LVAs, the node part is usually implicit (the current node).

A Global Virtual Address (GVA) is a 64-bit quantity, $$GVA = s_{32}:o_{32}$$

where the o is a byte offset within segments s.

An executing program manipulates local and global virtual addresses. Local references always use local virtual addresses, while remote references always use global virtual addresses. Native M88110 page translation maps local virtual addresses into local physical addresses. That is, node n decomposes v into a virtual page frame number and an offset within the page, $$v = vpn_{20}:offset_{12}$$

where vpn is the virtual page number. The page translation (PT) on node n maps the vpn into a physical page number, ppn, $$vpn \xrightarrow{PageXlate} ppn$$

So, the local physical address p is computed as, $$p = ppn_{20}:offset_{12}$$

where offset is copied from v. In contrast, segment translation, supported by the synchronization coprocessor, maps a global virtual address GVA into a local virtual address LVA. A segment descriptor encodes a set of attributes (e.g., valid, writable), how a segment is interleaved across nodes, and the base local virtual address for the segment, $$segment\text{-}descriptor[s] = (attributes, interleave\text{-}map, LVA_{base})$$

Figure 7:
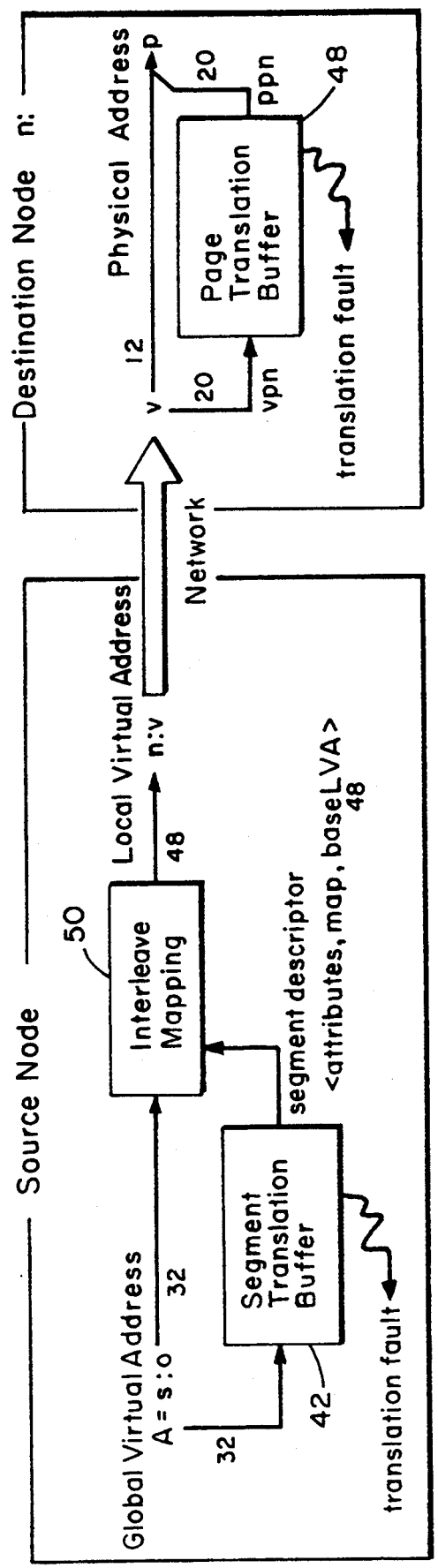
FIG. 7 illustrates global and local address translation in accordance with the present invention.

For example, suppose that a thread issues an rload of the GVA $A = s_{32}:o_{32}$, where s is the segment and o is the offset within the segment. As illustrated in FIG. 7, before formatting an rload_msg, the message formatter 40 fetches the descriptor for s in its segment translation buffer 42. If the descriptor is not found in the segment translation buffer then a trap is elicited on the M88110, which can then, under software control, load the segment descriptor it finds in a global hash table, for example. The mapping information is used through interleave mapping 50 to translate A into the LVA $n_{16}:v_{32}$, where n is a node number and v is a local virtual address on node n. The rload_msg is routed to node n, where the virtual address is translated, by page translation hardware 48 in local memory controller 46, into a local physical address $n_{16}:p_{32}$. The segment translation takes place on the requesting node, while the page translation is performed by the destination node.

Thus, there are three address spaces which map to each other. At each processor there is a local virtual address space which maps into a local physical address space. All translations between those spaces are performed locally. The many individual local vertical address spaces, in association with respective node designations, map into a global virtual address space which may be defined by segments and offsets. The data processor 22 references that global virtual address space directly through its 64-bit data bus to the message formatter 40 as discussed below and is thus not limited by its 32-bit address bus. Translations from the global address space to a node designation and local virtual address space are made by the message formatter 40 before transmitting a message.

The use by the processors 22 of a global address space, other than the node designations and local address spaces, distributes global memory accesses during a routine throughout the multiprocessor system. "Hot spots" which could cause bottlenecks in interprocessor communications are thus avoided.

With local use of virtual addresses, the system allows for a larger physical address space at each processor. Further, virtual addressing is required by such standards as Unix. By performing all virtual to physical translations at the receiving processor rather than at the transmitting message formatter, the system is not forced to a universal translation, each processor TLB 48 can be independent.

A continuation is the pair (FP, $L_S$) comprising a pointer to an activation frame, FP, and a start processor code label, $L_S$. It is particularly useful to pack a continuation into a single 64-bit word.

Recall, a given activation frame is mapped entirely onto a single node, and that all address arithmetic on frames are performed locally on local virtual addresses. It is thus possible to refer to frames only by their local virtual base addresses, which are 48-bit quantities. Now, assume a convention whereby the first word in a frame holds a pointer (a local virtual address) to the base of the start processor program text $SIP_{base}$. This lets us encode $L_S$ as a displacement from the $SIP_{base}$, $$L_S = SIP_{base} + \delta$$

where $\delta$ is the unsigned displacement. A continuation is encoded into 64-bits as follows, $$C = (n_{16}:v_{32},\delta_{16}) = (FP_{48},\delta_{16})$$

It is possible to further compress the encoding by enforcing modulo-alignment constraints on v (e.g., cache-line boundaries or larger) and $\delta$. It might be desirable to reduce it to less than 52 bits, so as to fit within an IEEE double precision NaN.

Alternatively, a full 24-bits may be retained for the instruction pointer $L_S$ and the number of bits in the frame pointer FP can be reduced to 40 bits. The reduction in frame pointer bits is obtained by restricting frames to start on multiples of 256 bytes so that the lower 8 bits are always zero.

Executing Dataflow Instructions on M88110

We now show how the M88110 implements rload, rstore, and start instructions. These instructions cause the nonblocking formation and transmission of msg_rload, msg_rstore, and msg_start messages, respectively. We also show how the M88110 implements the next instruction.

The message formatter within the synchronization processor implements a number of memory-mapped registers. The main ones are shown below:

| mOP | Message operation (rload, rstore, or start) |
|---|---|
| mA | Destination address GVA or FP |
| mI | Continuation start code displacement $\delta$ |
| mV | Message value |
| mDFP | Cached copy of DFP |

The mDFP register is a cached copy of the M88110's DFP register (the current activation frame). This register is automatically updated when the M88110 performs a next operation (see below).

To send a message, the M88110 first stores a global address (for rload or rstore) or an activation frame pointer (for start) in the mA register. Note that the address is written into the mA register as data. Then, the start code displacement, $\delta$, is written into the mI register. The displacement is used to form the return continuation (together with the contents of mDFP) in the case of msg_rload and msg_rstore. If the message has a value-part (i.e., a msg_start or msg_rstore, then the M88110 stores the value into the mV register. Finally, the desired operation is written into the mOP register. Writing to this register automatically causes the appropriate type of message to be formatted and transmitted.

For example, the following M88110 code sequence implements the rload of 64-bit double value. Assume that the M88110 register rMF contains a pointer to the message formatter register set, register rA contains the 64-bit global virtual address of the word to read, and register rI contains the start code displacement, $\delta$:

| L_do_rload.d: | | |
|---|---|---|
| st.d rA, rMF, _mA | | ; address to load into formatter reg mA |
| st rI, rMF, _mI | | ; start code disp. into formatter reg mI |
| or rmsg, _rload.d, rO | | ; formulate rload command to fetch 64 bits |
| st rmsg, rMF, _mOP | | ; tell formatter to launch rload message |

Note that the M88110 instruction st.d rA, rMF, _mA causes the contents of the double (64-bit) register rA to be stored at the address determined by adding the contents of register rMF to the immediate constant _mA (which we assume adjusts the address to point to the message formatter's mA register).

While the above rload sequence is straight-forward, it is rather inefficient as compared with the native M88110 load instruction (ld.d). As an optimization, we use the least significant bits of the addresses from the M88110 to pass information from the M88110 to the message formatter. Suppose that the message formatter decodes a range of 32-bit local addresses during an M88110 st.d as follows:

| SELECT | $\delta$ | msg_op | 000 |
|---|---|---|---|
| 8 | 16 | 5 | 3 |

The message formatter is selected whenever the M88110 performs a st.d operation to any address where the upper eight bits are set to the required SELECT bit pattern. That is, this feature consumes 1/256 of the local virtual address space. Here is what happens when the st.d executes:

| mA | ← | double value written |
|---|---|---|
| mI | ← | $\delta$ |
| mOP | ← | msg_op |

This also causes the message encoded by msg_op to be formatted and transmitted.

Now, the M88110 can issue a single instruction to initiate the rload. Assume that the M88110 register rSEL is all zeros, except for the upper eight bits, which are set to the message formatter SELECT code. Also assume that $\delta$ is a small constant (<255) called _delta:

| L_do_rload.d: | |
|---|---|
| st.d rA, rSEL, (_delta << 8) \|\| (_rload.d << 3) | ; initiate rload |

Note that the expression (_delta<<8) || (_rload.d<<3) is evaluated by the assembler, and is reduced to a 16-bit instruction immediate. The M88110 rst.d instruction stores the contents of the 64-bit register rA, which is assumed to contain the GVA of the location to read, to an address encoded in the fashion of the table above.

Finally, this is how the message formatter generates the msg_rload message:

| A | = Register[mA] |
|---|---|
| FP | = Register[mDFP] |
| δ | = Register[mI] |
| n.v | = SegmentXlate(A) |
| C | = (this_node.FP,δ) |
| Send message: | msg_rload n.v,C |

The implementation for rstore is similar to rload, except that we must also supply the value to store. This is accomplished by writing the value to the message formatter mV register, and then supplying the address:

```
L_do_rstore.d:
    st.d rV, rMF, _mV          ; value to store
    st.d rA, rSEL,             ; initiate rstore
    (_delta << 8) || (_rstore.d << 3)
```

The code assumes that the value to store is in register rV. The first rst.d writes the value to store into message formatter register mV. The second rst.d actually causes the network message to be initiated by supplying the address to write and the return continuation for the write acknowledgement. This is how the message formatter generates the msg_rstore message:

| V | = Register[mV] |
|---|---|
| A | = Register[mA] |
| FP | = Register[mDFP] |
| δ | = Register[mI] |
| n.v | = SegmentXlate(A) |
| Send message: | msg_rstore n.v,V,C |

The implementation for start is just like rstore, only instead of writing the address to store, we supply a continuation for the remote frame. Assume that M88110 register rRC contains the continuation of the remote frame:

```
L_do_start.d:
    st.d rV, rmF, _mV          ; value-part of
                                 start message
    st.d rRC, rSEL,            ; initiate start
    (_adj << 8) || (_start.d << 3)
```

Here, _adj is considered an adjustment to the δ-part of the supplied remote continuation. Although the M88110-side looks like an rstore, the response of the message formatter is quite different:

| V | = Register[mV] |
|---|---|
| adj | = Register[mI] |
| (n.v,δ) | = Register[mA] |
| δ | = δ + adj |
| C | = (n.v,δ) |
| Send message | msg_start C,V |

The operand size for rlaod, rstore, and start can vary from one to thirty-two bytes, in powers of two. The operand size is encoded as part of the message operation stored in the register mOP, and is carried on the message. E.g., rstore.b stores a byte, rload.s fetches four bytes, and start.q sends sixteen bytes.

Similarly, memory semantics are also encoded into rstore and rload messages. E.g., rIload.d fetches eight bytes according to I-structure semantics. I-structure and M-structure operations are only defined for eight-byte operands, or bigger. In the case of larger operands, i.e., sixteen and thirty-two bytes, I-structure semantics apply to the entire aggregate. The table below summarizes.

| Operand | Size (Bytes) | Ex- ten- sion | start | rload/rstore Im- perative | I- Structure | M- Structure |
|---|---|---|---|---|---|---|
| null | 0 | .n | | | | |
| byte | 1 | .b | | | | |
| halfword | 2 | .h | | | | |
| word/ single | 4 | .w/.s | | | | |
| double | 8 | .d | | | | |
| quad- word | 16 | .q | | | | |
| octword | 32 | .o | | | | |

When the M88110 wants to begin executing a new thread it executes a next instruction which, from its perspective, is simply the popping of an FP,IP pair from the synchronization processor's thread queue 32, and then a transfer of control to the new IP. The synchronization processor presents the head of the thread queue as a memory-mapped 64-bit register sQ, which contains the next FP and IP.

Note that FP and IP are both 32-bit local virtual addresses. Assume that the M88110 register rQ points to the synchronization processor register sQ, and that M88110 register rDFP contains a pointer to the current activation frame. It is also assumed that M88110 register rDIP is allocated adjacent to rDFP, such that when rDFP is loaded with a double (64-bit) value, rDFP receives the most significant thirty-two bits and rDIP receives the least significant thirty-two bits. Here is the sequence that M88110 executes to implement next:

```
ld.d rDFP, rQ, O    ; pop FP, IP pair from head of queue
jmp rDIP            ; jump to the new thread
```

The act of popping the FP, IP pair from the queue also has the side-effect of setting the message formatter's cached version of the current data processor activation frame (mDFP) to the new FP.

The Synchronization Processor

The RMem processor is a finite-state machine that consumes msg_rload and msg_rstore messages destined for the current node, and either responds with a msg_start back to the requesting processor, or elicits a trap on the M88110 for handling conditions beyond its capability. Other than normal imperative operations, the processor will implement at least the basic layer of I-structure and M-structure protocol.

Presence bits may be maintained as additional bits tagged to each word (or a cache line's worth of words), or as bits packed into 64-bit words in the local virtual address space. Multiple-deferred readers of an I-structure or M-structure may be handled through Monsoon-style request threading, trapping the local M88110, or local deferred list management. Errors, like multiple writes, may be handled by responding with a msg_error, or trapping the local M88110.

Note that the RMem processor never need perform segment translation, because the frame pointers of the return continuations are always represented as local virtual addresses. It simply consults the node-part of the frame address when formulating a msg_start response.

The start processor handles all msg_start messages destined for the current node. The start processor implements the first "layer" of message handling and synchronization:

1. Writes the value-part of the start message into an offset in the activation frame, the frame also being specified by the start message.
2. Performs a join operation on counter values in the activation frame specified by the start message.
3. Posts ready threads to a queue that can be popped by the M88110 when executing a next operation.

There are three primary ways in which an M88110 and its local Start Processor interact; (1) the M88110 can execute a rload, rstore, or start which either directly or indirectly results in a msg_start message destined to the local Start Processor; (2) in the course of processing a msg_start message, the Start Processor writes activation frame locations which are subsequently read by an M88110 thread; (3) the M88110 executes a next instruction which pops the continuation for the next thread to execute from a queue managed by the Start Processor.

Of the three modes of M88110-Start Processor interaction, communication through shared activation frame locations is the most unstructured. We can rationalize the communication by establishing a set of conventions for the usage of storage within a frame. Logically, we divide an activation frame into four areas:

| Activation Frame Area | Start Proc. | M88110 |
|---|---|---|
| Linkage - IP BASE | Read-Only | R/W |
| Join Counters | R/W | Read-Only |
| Message Values | Write | Read |
| Inter-Thread Values | | R/W |

Recall, a msg_start message comprises a continuation and a value, msg_start=(FP, δ),V where FP is a pointer to the base of an activation frame, and V is variable-sized value, from zero to thirty-two bytes. The code pointer for the message handler is computed as, $SIP = SIP_{base} + \delta$ where $SIP_{base}$ is by convention, stored in the first word in the current activation frame, i.e., FP[0].

Here are the Start Processor registers 52 which are automatically loaded upon dispatching to the handler of a new message:

| | |
|---|---|
| SIP | Message handler instruction pointer |
| SFP | Current activation frame base |
| SV | Message value (MSW) |
| SV1 | Message value |
| SV2 | Message value |
| SV3 | Message value (LSW) |

One of the first actions of most every message handler is to write Message Value registers to offsets in the activation frame pointed to by SFP.

An important new dimension of *T is an explicit hierarchy of scheduling data processor threads. In Monsoon the only control over scheduling is the ability to force a recirculation of a token; this is key concept behind a Monsoon thread. The principle motivation to extend the control over scheduling beyond the thread level is to induce temporal locality. Biasing scheduling across a small subset of frames can enhance hit rates in the processor data cache 62 and instruction cache. Biasing scheduling towards threads within a frame permits the speculative allocation of temporary registers 68. That is, if threads related to the same frame are scheduled one after the other, then the threads can potentially communicate values through temporary registers which might otherwise be indeterminate.

Our implementation implements the scheduling hierarchy through a very simple mechanism called a frame registry, a small associative table 44 of activation frame base pointers. When the start processor attempts to post an FP, IP pair, the frame registry is queried. If the FP is found in the registry, then the pair is enqueued into a hardware-managed thread queue. There is logically one such thread queue for each registered frame. If the FP is not found in the registry, then a trap is elicited (probably on the start processor, though perhaps on the M88110) and the IP is enqueued onto a software-managed list of ready, but presently-inactive, frames.

When the M88110 executes a next instruction, it pops an FP, IP pair from one of the registered frames. The hardware biases scheduling within the frame by always giving an FP, IP pairs from the same frame until that framer's queue is depleted. Only then does the popping focus on another registered frame. As an option, "cleanup" and "startup" threads can be executed whenever the scheduling crosses a frame boundary.

Execution continues in this fashion until all the queues of the registered frames are empty. When the M88110 executes a next instruction under this condition, it is given an "out of work" thread which, presumably, deregisters the least recently used frame and registers a frame from the software managed queue of ready frames.

Figure 8:
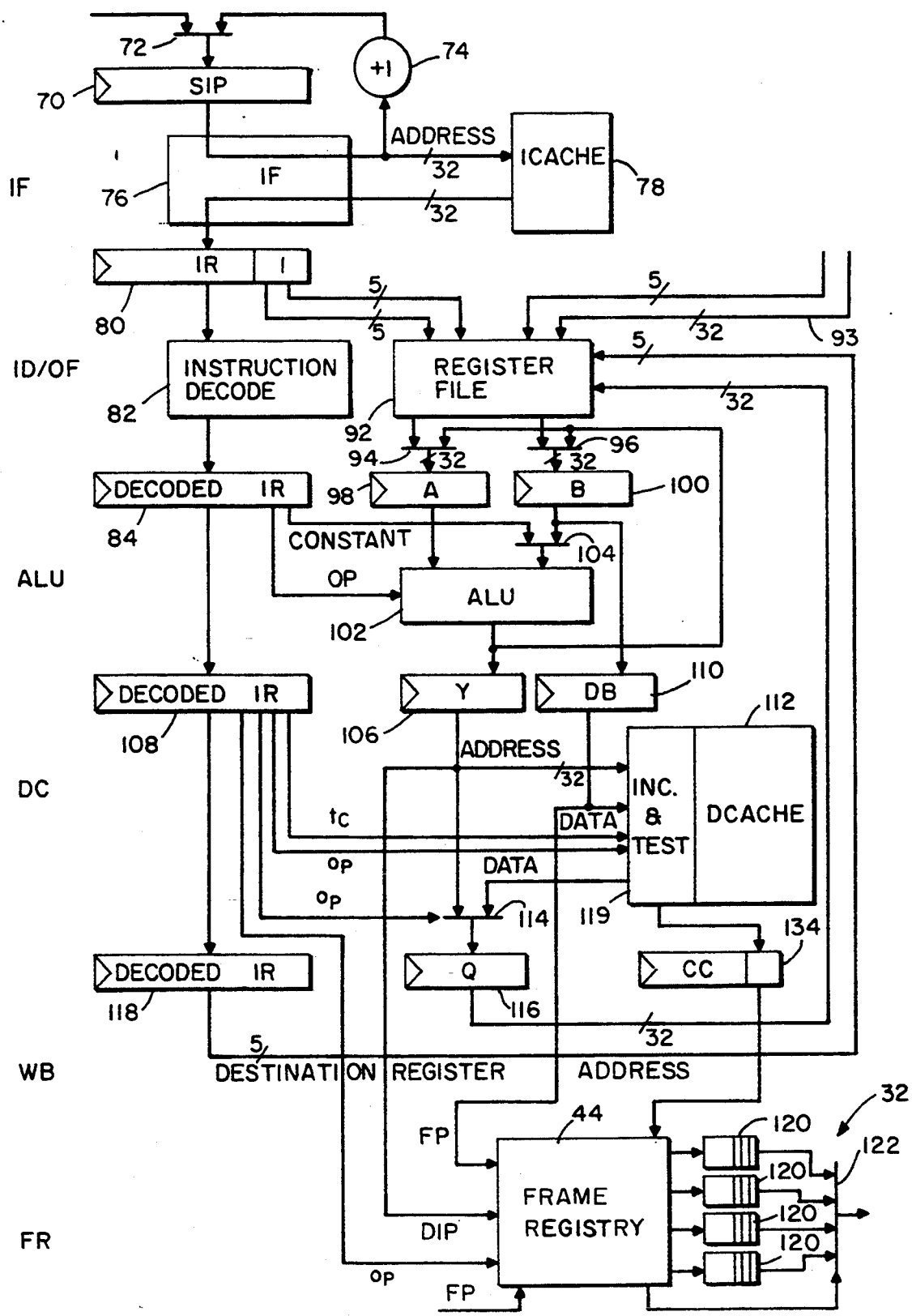
FIG. 8 is a detailed illustration of the Start Processor of FIG. 6.

FIG. 8 illustrates a specific implementation of the Start Processor 24. When a message is received, the frame pointer, instruction pointer and value are automatically written in to the SIP register 70 and appropriate registers of the register file 92 through data path 93. Also, the frame pointer is loaded into the frame registry 44. In the implementation shown, it is assumed that the Start Processor instruction pointer SIP is carried by the message. If instead the value δ is carried by the message, an additional stage would be provided to fetch the instruction pointer base and compute SIP.

The instruction pointer is stored in a register 70 through a multiplexer 72. Alternatively, the multiplexer 72 may select the prior SIP incremented by 1 at 74. Instruction fetch logic 76 addresses the instruction cache 78 to retrieve a 32 bit instruction which is stored in instruction register 80. A portion of the instruction is decoded by logic 82 and the decoded instruction is stored in decoded Ir register 84. Ten bits from the instruction stored in register 80 are used to address two operands in a register file 92. The operands in the addressed registers are written through multiplexers 94 and 96 to respective registers 98 and 100. Alternatively, the previous output from the ALU 62 may be written back through one of the multiplexers 94, 96 to one of the registers 98, 100.

Either a constant from the decoded IR register 84 or the value held in the B register 100 is selected by a multiplexer 104 to be operated on along with the value in the A register 98 according to an opcode from the register 84. The output from the ALU is stored in a Y register 106 as the decoded instruction is passed to register 108. The value from the B register 100 is also passed to a DB register 110.

When data is to be written into the data cache 112 the Y register 106 carries the cache address and the DB register 110 carries the data to be stored. Similarly, the Y register 106 would hold the address when data is to be written from the data cache 112. Alternatively, the Y register 106 may carry data which is selected by a multiplexer 114 to be stored in the data output Q register 116. As data is stored in the Q register 116, the decoded instruction is moved from register 108 to register 118. The data held in Q register 116 may be written back to the register file at an address taken from the decoded instruction register 118.

As thus far described, the Start Processor of FIG. 8 is a conventional five-stage pipeline processor including an instruction fetch stage IF, an instruction decode/operand fetch stage ID/OL, an arithmetic and logic stage ALU, a data cache stage DC and a writeback stage WB. The system is modified to include hardware for testing a count value fetched from the cache 112, incrementing the value and restoring the value. That hardware allows for a rapid test to determine whether all operands have been received for a join operation. If the test indicates that all operands have been received the frame pointer and data processor instruction pointer are directed to the frame registry 44.

Connected in parallel with the cache stage DC is a frame registry stage FR. As discussed below, when a join operation succeeds, the frame registry 44 receives a data processor instruction pointer from register 106 and a frame pointer from register 110 to generate a continuation. The frame registry maintains a queue 32 of continuations to be fetched by the data processor 22 to initiate a new thread of computation. Specifically, the queue 32 includes a set of queues 120, each established for a particular frame. The active frame is selected by a multiplexer 122.

Figure 9:
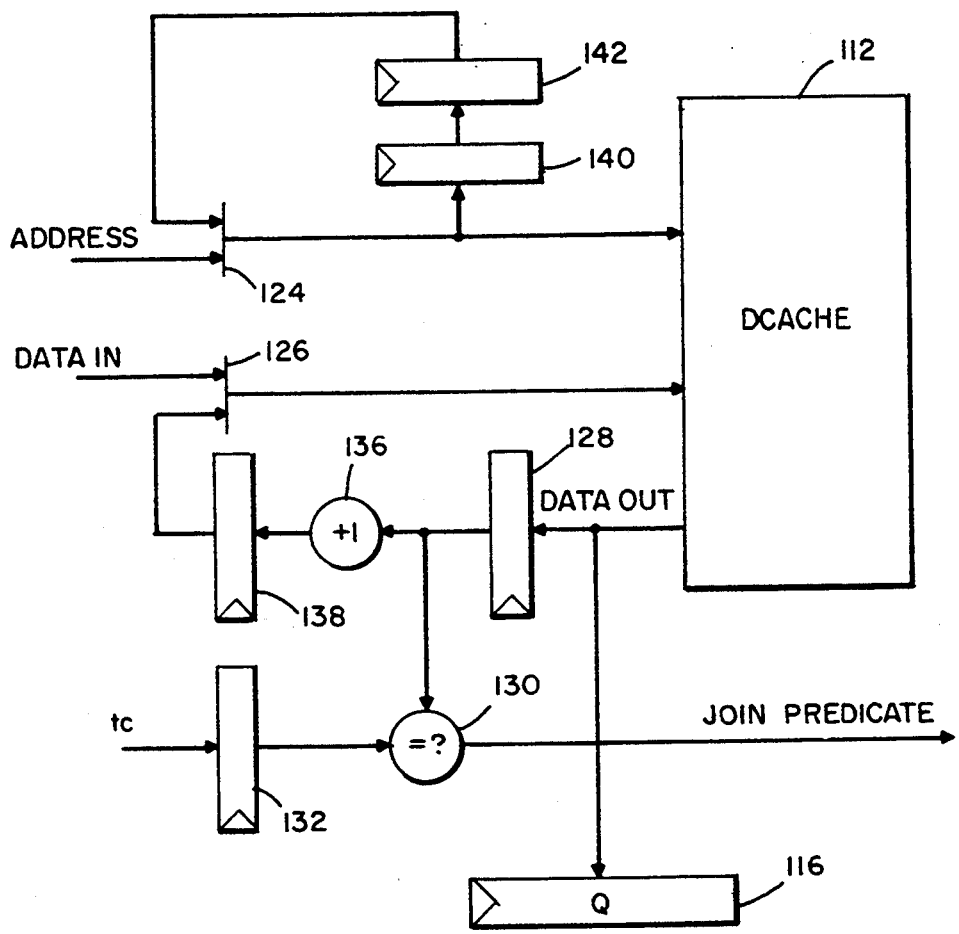
FIG. 9 is a detailed illustration of the increment and test logic of the Start Processor of FIG. 8.

Details of the increment and test logic 119 are presented in FIG. 9. In the case of an ordinary cache operation, the address from the Y register 106 is selected by multiplexer 124. If data is to be written into cache it is selected by multiplexer 126. Similarly, when data is to be read out from cache the address from register 106 is selected by multiplexer 124 and the data output from the cache is stored in the Q register 116. A prinicipal operation of the Start Processor is to check the counter value from cache, increment it to indicate that another operand has been received and then restore the incremented value. To that end, the counter value is first retrieved from the cache 112 at an address received from the register 106. That counter value is stored in register 128 and then compared at 130 with the counter threshhold value $t_c$. The value $t_c$ is taken from the decoded instruction register 108 and held in a register 132. If the counter and the threshhold value $t_c$ are equal, a join predicate bit is written into a condition code register 134 (FIG. 8). In a subsequent conditional post operation, if the predicate bit is set, a continuation is forwarded to the frame registry 44.

The counter value retrieved from cache 112 and held in register 128 is incremented at 136 and the incremented value is stored in register 138. That value is then written back through multiplexer 126 into the counter location in cache 112 previously accessed. To again access that same location, the address is delayed in registers 140 and 142 and then selected by multiplexer 124 as the incremented value is selected by multiplexer 126.

Figure 10:
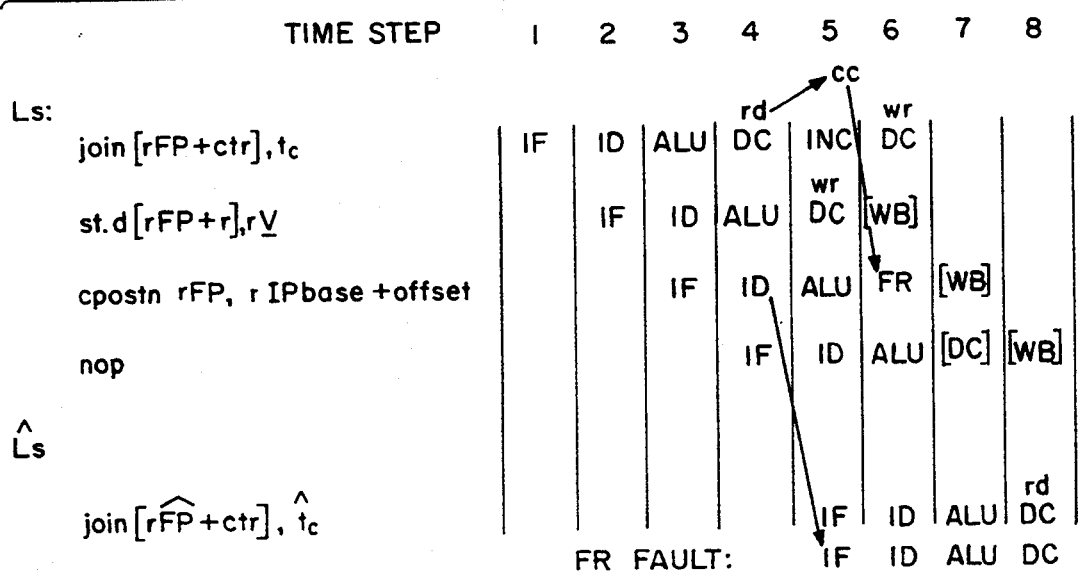
FIG. 10 is a reservation table illustrating timing of operations within the pipeline of FIG. 8 relative to instructions in response to a start message.

FIG. 10 illustrates processing of a start message by the processor of FIG. 8. The table indicates the stage in which each instruction is being processed at successive time steps. With reference to the join operation, in the ALU stage the frame pointer taken from the message and held in the register file is added to a counter pointer which is common to all messages and held in the register file. In the data cache stage the counter value is read from the cache 112. As illustrated in FIG. 9, that value is incremented as a comparison is made to the value $t_c$ in the decoded instruction. The incremented value is then written back to the cache. If the comparison indicates that all arguments are on hand, the join predicate bit (FIG. 9) is applied to register 134.

As the join instruction is being decoded, the double word store instruction of this code is fetched from the instruction cache. In the ALU stage, that instruction computes the address in cache at which the operand value is to be stored. Specifically, it adds the frame pointer value received in the message with a value r carried by the instruction. In the data cache stage, the value V received in the message and stored in the register file is written from the DB register 110 into the cache 112 at the address computed by the ALU and stored in the Y register 106.

As the double word store instruction is being decoded, a conditional post instruction is fetched from the instruction cache 78. At the ALU stage, the DIP of a continuation is computed from the IP base stored in the register file and an offset from the decoded instruction, and the DIP is placed in register 106. The frame pointer FP is stored from the register file into register 110. In the next step, if the predicate bit had previously been set from the join operation, the continuation is forwarded to the frame registry from registers 106 and 110. If not, the condition has not been met and there is no further operation.

A no-operation is included in the next line of code. This allows for a time step in the event of a jump due to a registry fault. The registry fault occurs if there is set if there is a successful join operation in which the predicate bit is set but the frame pointer is not included in the registry table. The frame registry is loaded with the frame pointer when the message is received so the table can be checked ahead of time (step 5 in FIG. 10). In the event of a registry fgault there is a jump in time step 5 which delays the next join instruction.

Comparison with other Dataflow Processors

All dataflow machines that have been designed or built since 1988 (e.g., Monsoon, EM-4, Sandia Epsilon, IBM Empire, P-RISC, McGill's argument-fetching machine) are frame based and, thus, have avoided an associative store for tokens. Since many researchers had considered the associative store to be totally unacceptable for high performance machines, its elimination has caused a new surge of interest in dataflow architectures.

Now all the attention seems to be focused on gaining sequential-thread performance.

*T is the first proposal for a dataflow machine that can keep total compatibility with an existing microprocessor. In this respect it goes beyond P-RISC (R. S. Nikhil and Arvind, "Can dataflow subsume von Neumann computing?", *Proceedings of the 16th Annual International Symposium on Computer Architecture*, Jerusalem, Israel, pages 262-272, May 29-31, 1989) because P-RISC only tried to maintain instruction set compatibility, while the *T approach uses an existing microprocessor as is. P-RISC also suggested interleaved pipelining of threads, as in Monsoon and the HEP, which required a number of active threads to keep a processor completely utilized. This could show poor performance on existing single-thread codes. The *T approach also takes the preparation to run a thread out of the data processor pipeline. Thus, the data processor pipeline is not disturbed by short threads which need be executed only to determine if another thread is ready to execute.

It is worth noting that maintaining compatibility with an existing processor does have some costs. For example, direct frame-based addressing, as described in the P-RISC paper, may be more desirable for implementing Id-like languages. It may also be useful for parallel implementation of C or Fortran.

Monsoon, as discussed earlier, has poor single thread performance as compared to a modern RISC processor (G. M. Papadopoulos and D. E. Culler, "Monsoon: An Explicit Token Store Architecture," *Proc. 17th Intl. Symp. on Compter Architecture*, Seattle, Wash., May 1990). This can be attributed to a lack of ways to address local state, i.e., registers. The notion of efficient threads and registers were not the primary motivations behind Monsoon, so it is interesting that threads can be done at all. Monsoon has proven to be excellent in exploiting fine-grain parallelism. It is our goal to make the *T processor as efficient as Monsoon in executing synchronization code. *T may not quite compete with Monsoon on threads that are one or two instructions long. However, we hope that the crossover point for thread size will be small enough so that compiling Id, a non-strict language, remains relatively easy. It is certain that *T would do much better than Monsoon on existing Fortran or C codes.

The pipeline of the EM-4 (S. Sakai, Y. Yamaguchi, K. Hiraki, and T. Yuba, "An Architecture of a Dataflow Single Chip Processor," *Proc. 16th Annual International Symposium on Computer Architecture*, Jerusalem, Israel, pages 46-53, May 28-Jun. 1, 1989) can be viewed as a two stage pipeline where the first stage takes tokens from the network and essentially prepares threads for execution, while the second stage executes the thread. These correspond only roughly to our Start and Data Processors, respectively, but unlike our system, they do not operate independently and asynchronously. The EM-4 does not have any analog to our RMem Processor. In the design of EM-4, not much consideration has been given to executing existing codes efficiently. The software strategy for EM-4 has not been clearly articulated.

In the McGill argument-fetching architecture J. B. Dennis, "Data Flow Supercomputers," pages 368-373, Nov. 14-18, 1988), the processor is partitioned into a Pipelined Instruction Processing Unit (PIPU) and a Dataflow Instruction Scheduling Unit (DISU), similar to our Data and Start Processors, respectively. The McGill partitioning appears primarily motivated by a desire to reduce data movement and, consequently, the complexity of data paths; the signal flow graph that is executed by the DISU still retains the full structure of the original dataflow graph, so that every instruction is still enabled with the general synchronization mechanism. Thus, single-thread performance is not likely to be very good, and it is difficult to utilize registers or caches. Their approach to non-local memory accesses is quite different from our approach. It is very similar to the approach in the HEP, where remote accesses are taken aside into a "parking" area during the access.

Comparison with other innovative von Neumann Processors

The development of commercial RISC processors have been primarily in the direction of superscaler pipelines where multiple instructions are dispatched from a sequential instruction stream. No attention has been paid to parallel processing except for some hooks for maintaining cache coherence. However, there are some developments in the research community where close attention is being paid to memory latency and synchronization issues.

A popular approach to tackling memory latency in parallel machines is to replicate the processor state a small number of times (say, 4 or 8) so that, when the processor has to perform a non-local access, it can switch to another thread without having to save the current processor state (A. Agarwal, B. -H. Lin, D. Franz, and J. Kubiatowicz, "April: A processor architecture for multiprocessing," *Proc. 17th Annual Intl. Symp. on Computer Architecture*, Seattle, Wash., U.S.A., pages 104-114, May 28-31, 1990, R. H. Halstead Jr. and T. Fujita, "MASA: A Multithreaded Processor Architecture for Parallel Symbolic Computing," *Proceedings of the IEEE 15th Annual International Symposium on Computer Architecture*, Honolulu, Hi., June 1988, and W. -D. Weber and A. Gupta, "Exploring the Benefits of Multiple Hardware Contexts in Multiprocessor Architecture: Preliminary Results," *Proceedings of the 16th. Annual International Symposium on Computer Architecture*, Jerusalem, Israel, pages 273-280, May 29-31, 1989). In order to reduce the number of non-local accesses, it is sometimes proposed that non-local data be cached locally, using some mechanism (e.g., directories) to keep such caches globally coherent. Hopefully, by the time the processor tries to switch back to the original thread, the non-local data will be available. If the access has not completed, a trap is taken and it is handled explicitly in software.

Effective, coherent caches for large parallel machines have yet to be demonstrated. In *T instead of replicating processor state, we have chosen to utilize those resources by organizing them into tow or three specialized processors for intra-thread, inter-thread and remote memory functions.

The Denelcor HEP, designed by Burton Smith, used multithreaded processors to mask the latency of memory access. The processor maintained up to 8 sets or registers, switching between 8 threads on each clock on a round-robin basis (so, single-thread performance was not a priority). All memory was global—there was no local memory. A thread that accessed global memory was taken out of the main pipeline and kept aside until the response arrived. The processor had a pool of up to 64 threads to keep it busy. Each memory location had presence bits for data level synchronization.

Unlike *T, which has no architectural limit on the number of threads, the HEP permitted too few threads to be able to compile effectively for it. Also, even though memory-referencing threads were taken out of the main pipeline, there was still some degree of busy-waiting on long-latency accesses. The limitations of the HEP are also discussed in Arvind and R. A. Iannucci, "Two Fundamental Issues in Multiprocessing," *Proceedings of DFVLR—Conference 1987 on Parallel Processing in Science and Engineering*, Bonn-Bad Codesberg, W. Germany, Springer-Verlag LNCS 295, Jun. 25-29, 1987.

Burton Smith's new machine at Tera Computer fixes many shortcomings of the HEP and provides much more control over the scheduling of memory references than any other machine we are familiar with (J. T. Juehn and B. J. Smith, "The Horizon Supervomputing System: Architecture and Software," *Prof. IEEE Supercomputing Conference*, Florida, pages 28-34, 1988 and M. R. Thistle and B. J. Smith, "A processor architecture for horizon," *Prof. IEEE Supercomputing Conference*, Florida, pages 35-41, 1988). Tera is complex enough that a feature-by-feature comparison will take too long to describe here.

The J-Machine is a massively parallel machine whose processors are Message-Driven processors (W. Daily, L. Chao, A. Chien, S. Hassoun, W. Horwat, J. Kaplan, P. Song, B. Totty, and S. Wills, "Architecture of a Message-Driven Processor," *Proc. 14th. Annual Intl. Symp. on Computer Architecture*, Pittsbuirgh, Pa., pages 189-196, June 1987). It is an attempt to improve on Hypercube-like designs by providing very fast vectoring to message handlers, fast access to the contents of incoming messages, and minimal processor state, in order to reduce the latency of message handling. While vectoring to a message handler may be fast, the handler has to execute code to move data from the message into registers, whereas our Start Processor has its SFP and SV registers automatically loaded. Where we use three specialized processors in a node for three classes of activities (intra-thread, inter-thread, and remote memory accesses), the MDP is a single processor that does all the work. Where we can have a small register file in the Start Processor and a large one in the Data Processor, the MDP uniformly has a small register file, which is likely to penalize single thread performance.

Conclusion

Conventional microprocessors are excellent at executing single threads, but do not handle long latency operations or synchronization operations well. Consequently, unless we carefully craft our programs to minimize communication, a massively parallel machine built with these components is likely to have poor utilization at each node.

Data flow processors have complementary strengths and weaknesses—they are very good at handling long latencies and providing cheap synchronization, but have poor single-thread performance. Consequently, a workstation built out of such components is not likely to be competitive; therefore, such processors are not likely to become commodity parts.

We believe that *T is the first proposed architecture that can execute single threaded programs as efficiently as conventional microprocessors, fine-grain parallel programs as efficiently as dataflow processors, and provide a smooth spectrum of operating points in between.

While this invention has been particularly shown and described with references to preferred embodiments thereof, it will be understood by those skilled in the art that various changes in form and details may be made therein without departing from the spirit and scope of the invention as defined by the appended claims.

We claim:

1. A data processing system comprising:
   a data processor for processing threads of computation with respect to frames of data, threads of computation including operations to generate messages with operands for initiating new threads of computation; and
   a synchronization coprocessor for responding to messages by processing message handlers which store the operands carried by the messages into the frames of data and which indicate to the data processor when conditions including availability of the operands in the frames of data are met such that new threads of computation are to be performed, the data processor being synchronized to availability of operands by initiating processing of the new threads of computation with respect to the frames of data after the synchronization coprocessor indicates that the new threads of computation are to be performed.

2. A data processing system as claimed in claim 1 further comprising a message formatter instructed by the data processor to create and send messages to remote nodes of the data processing system.

3. A data processing system as claimed in claim 2 wherein the message formatter comprises registers on a common bus with the data processor in the address space of the data processor and the data processor instructs the message formatter to create and send message to remote nodes by memory mapped stores to the message formatter registers.

4. A data processing system as claimed in claim 3 wherein the data processor loads global virtual addresses along its data bus into registers in the message formatter, a number of bits in the global virtual address being greater than a number of bits available in the local virtual address space of the data processor, and the message formatter translates the global virtual address to a node designation and a local virtual address on that node.

5. A data processing system as claimed in claim 4 wherein each node translates local virtual addresses to local physical addresses for local memory accesses from the data processor and for local memory accesses in response to messages from remote nodes.

6. A data processing system as claimed in claim 1 wherein the data processor and the synchronization coprocessor communicate with a common local memory in which operands are stored within activation frames by the synchronization coprocessor and fetched by the data processor.

7. A data processing system as claimed in claim 6 further comprising a cache memory shared by the data processor and synchronization coprocessor.

8. A data processing system as claimed in claim 7 wherein the data processor is a single chip microprocessor having a cache memory thereon.

9. A data processing system as claimed in claim 1 wherein the synchronization coprocessor comprises a queue to which continuations are posted to serve as indications to the data processor that the new threads of computation are to be initiated.

10. A data processing system as claimed in claim 9 wherein the queue presents continuations according to priority to continue processing active frames.

11. A data processing system as claimed in claim 10 wherein the synchronization coprocessor comprises a frame registry which identifies active frames to be given priority in the queue.

12. A data processing system as claimed in claim 11 wherein the system maintains a software list of continuations where capacity of the registry is exceeded.

13. A data processing system as claimed in claim 9 wherein the continuations comprise a pointer to an activation frame and a pointer to a data processor instruction.

14. A data processing system as claimed in claim 9 wherein the queue is on a bus of the data processor and new threads of computation are initiated by the data processor by loading continuations from the queue.

15. A data processing system as claimed in claim 1 wherein the messages include an object oriented message which identifies a method, an object and argument, and the synchronization coprocessor stores the argument in a frame and provides a frame pointer to the data processor.

16. A data processing system as claimed in claim 15 wherein the synchronization coprocessor processes the method and object identifications to locate an instruction pointer for the data processor.

17. A data processing system as claimed in claim 1 which is a multiprocessor system of a plurality of processing nodes, each processing node comprising one of said data processors and one of said synchronization coprocessors.

18. A data processing system as claimed in claim 16 wherein each data processor operates on a local virtual address space, and each node comprises means for translating from the local virtual address space to a local physical address space, each data processor generating a global virtual address space to access an address in a remote node, and each node comprising means for translating the global virtual address to a node designation and a local virtual address of the remote node.

19. A data processing system as claimed in claim 1 wherein the messages include a start message which comprises a pointer to an activation frame and a pointer to a synchronization coprocessor instruction.

20. A data processing system as claimed in claim 1 wherein the synchronization coprocessor comprises a start processor for processing start messages and a remote memory processor for processing remote memory load and store instructions from remote nodes.

21. A data processing system as claimed in claim 1 wherein the synchronization coprocessor is a programmable processor.

22. A data processing system as claimed in claim 1 wherein the synchronization coprocessor comprises a processing pipeline including hardware for counting operands received for the threads of computation.

23. A data processing system as claimed in claim 1 wherein the synchronization coprocessor comprises a processing pipeline including increment and test hardware for incrementing a value fetched from cache memory, testing the value to test whether all operands for a computational thread have been received, and returning the incremented value to cache memory.

24. In a multiprocessor system comprising a plurality of processing nodes, each node processing multiple threads of computation, the system comprising at each processing node:
   a data processor which processes threads of code, the code including instructions to create messages with data values to start new threads of computation; and
   a synchronization coprocessor for processing messages from the same node and other nodes of the system, the synchronization coprocessor processing messages to store values from the messages as operands for the threads of computation, to determine when all operands required for the threads of computation have been received and to provide indications to the data processor that the threads of computation are to be initiated, the data processor nonsynchronously initiating processing of the threads of computation after completion of prior threads of computation in response to the indications from the synchronization coprocessor.

25. A data processing system comprising:
   a data processor which sequentially processes, as threads of code, code blocks including local memory load and store instructions, start instructions which cause start messages to be sent with data values to start new threads of computation and remote memory load and store instructions which cause messages to be sent to remote memory locations to fetch or store data from or in the remote memory locations; and
   a synchronization coprocessor which receives start messages and processes the start messages to store data values from the start messages as operands for the threads of computation, to determine when all operands required for the threads of computation have been received and to provide indications to the data processor that the threads of computation are to be initiated, the data processor nonsynchronously initiating processing of the threads of computation after completion of prior threads of computation in response to the indications from the synchronization coprocessor.

* * * * *